(12) United States Patent
Ross et al.

(10) Patent No.: US 12,346,400 B2
(45) Date of Patent: Jul. 1, 2025

(54) SUPRA BOUNDARY WEB COMPOSITOR APPARATUSES, METHODS AND SYSTEMS

(71) Applicants: Timothy Donald Ross, West Hartford, CT (US); David Anthony Sidman, Brooklyn, NY (US)

(72) Inventors: Timothy Donald Ross, West Hartford, CT (US); David Anthony Sidman, Brooklyn, NY (US)

(73) Assignee: Content Directions, Inc., New York, NY (US)

( * ) Notice: Subject to any disclaimer, the term of this patent is extended or adjusted under 35 U.S.C. 154(b) by 0 days.

(21) Appl. No.: 16/578,266

(22) Filed: Sep. 20, 2019

(65) Prior Publication Data

US 2020/0019584 A1 Jan. 16, 2020

Related U.S. Application Data

(63) Continuation of application No. 15/709,096, filed on Sep. 19, 2017, now abandoned.
(Continued)

(51) Int. Cl.
*G06F 17/00* (2019.01)
*G06F 16/00* (2019.01)
(Continued)

(52) U.S. Cl.
CPC ............ *G06F 16/972* (2019.01); *G06F 16/00* (2019.01); *G06F 16/957* (2019.01); *G06F 16/986* (2019.01)

(58) Field of Classification Search
CPC .... G06F 16/972; G06F 16/957; G06F 16/986; G06F 16/00; G06F 16/958
(Continued)

(56) References Cited

U.S. PATENT DOCUMENTS 8,354,010 B2 1/2013 Pless
8,409,422 B2 4/2013 Vancina
(Continued)

FOREIGN PATENT DOCUMENTS

CN 103883491 6/2016
EP 2213768 8/2010
(Continued)

OTHER PUBLICATIONS

International Search Report and Written Opinion of the International Search Authority mailed on Jan. 4, 2018 for PCT application No. PCT/US2017/052260 filed on Sep. 19, 2017.
(Continued)

*Primary Examiner* — Jason T Edwards
(74) *Attorney, Agent, or Firm* — Hanchuk Kheit LLP.; Walter G. Hanchuk

(57) ABSTRACT

The Supra Boundary Web Compositor Apparatuses, Methods and Systems ("SBWC") transforms webpage request inputs via SBWC components into composited expandable element outputs. A top level listening (TLL) component that creates a node list of first level frames is provided. The TLL component executes components provided by a frame busting (FB) component. A first frame obtains a frame escaping (FE) component. The FE component generates a unique frame identifier and creates a second frame that obtains the FB component. The FE component listens for TLL messages, determines a node list identifier of a first level frame, and sends the node list identifier to the FB component. The FB component generates a component that facilitates determining which first level frame contains associated expandable display payload. The FB component listens for FE messages, determines the node list identifier, and generates a component that facilitates rebuilding the expandable display payload in webpage top level.

18 Claims, 10 Drawing Sheets

Related U.S. Application Data

(60) Provisional application No. 62/396,796, filed on Sep. 19, 2016, provisional application No. 62/396,799, filed on Sep. 19, 2016.

(51) Int. Cl.
*G06F 16/957* (2019.01)
*G06F 16/958* (2019.01)

(58) Field of Classification Search
USPC .......................................................... 715/255
See application file for complete search history.

(56) References Cited

U.S. PATENT DOCUMENTS

| | | | |
|---|---|---|---|
| 8,608,936 | B2 | 12/2013 | Skomsvold |
| 9,092,731 | B1 | 7/2015 | Shubina et al. |
| 9,797,521 | B1 | 10/2017 | Davis |
| 2004/0095705 | A1 | 5/2004 | Mayo |
| 2005/0029120 | A1 | 2/2005 | Bar-Gadda |
| 2006/0131008 | A1 | 6/2006 | Ogawa |
| 2006/0294499 | A1* | 12/2006 | Shim .................... G06F 8/10 717/107 |
| 2007/0163877 | A1 | 7/2007 | Brown |
| 2007/0178338 | A1 | 8/2007 | McElroy |
| 2008/0241614 | A1 | 10/2008 | McCanny |
| 2009/0038958 | A1 | 2/2009 | Coyle |
| 2009/0328063 | A1* | 12/2009 | Corvera ................. G06F 9/54 719/315 |
| 2010/0133029 | A1 | 6/2010 | Moran |
| 2010/0230272 | A1 | 9/2010 | Gonzalez |
| 2010/0239943 | A1 | 9/2010 | Kobayashi |
| 2011/0161990 | A1 | 6/2011 | Smith et al. |
| 2011/0225540 | A1 | 9/2011 | D'Entremont et al. |
| 2011/0262313 | A1 | 10/2011 | Hitz |
| 2012/0084641 | A1* | 4/2012 | Chung .................. G06F 16/972 715/240 |
| 2012/0101907 | A1 | 4/2012 | Dodda |
| 2013/0084474 | A1 | 4/2013 | Mills |
| 2014/0072836 | A1 | 3/2014 | Mills |
| 2015/0171455 | A1 | 6/2015 | Mills |
| 2016/0195269 | A1 | 7/2016 | Yoshikawa |
| 2017/0152840 | A1 | 6/2017 | Yamazaki |
| 2017/0324303 | A1 | 11/2017 | Stoltenberg |

FOREIGN PATENT DOCUMENTS

| | | |
|---|---|---|
| EP | 2533250 | 12/2012 |
| WO | 2009009496 | 1/2009 |
| WO | 2009-148981 | 12/2009 |
| WO | 2012138576 | 10/2012 |

OTHER PUBLICATIONS

International Search Report and Written Option of the International Search Authority mailed on Jan. 4, 2018 for PCT application No. PCT/US2017/052260 filed on Sep. 19, 2017.

European Search Report issued on Jun. 25, 2020 for EP application No. EP17847543.

* cited by examiner

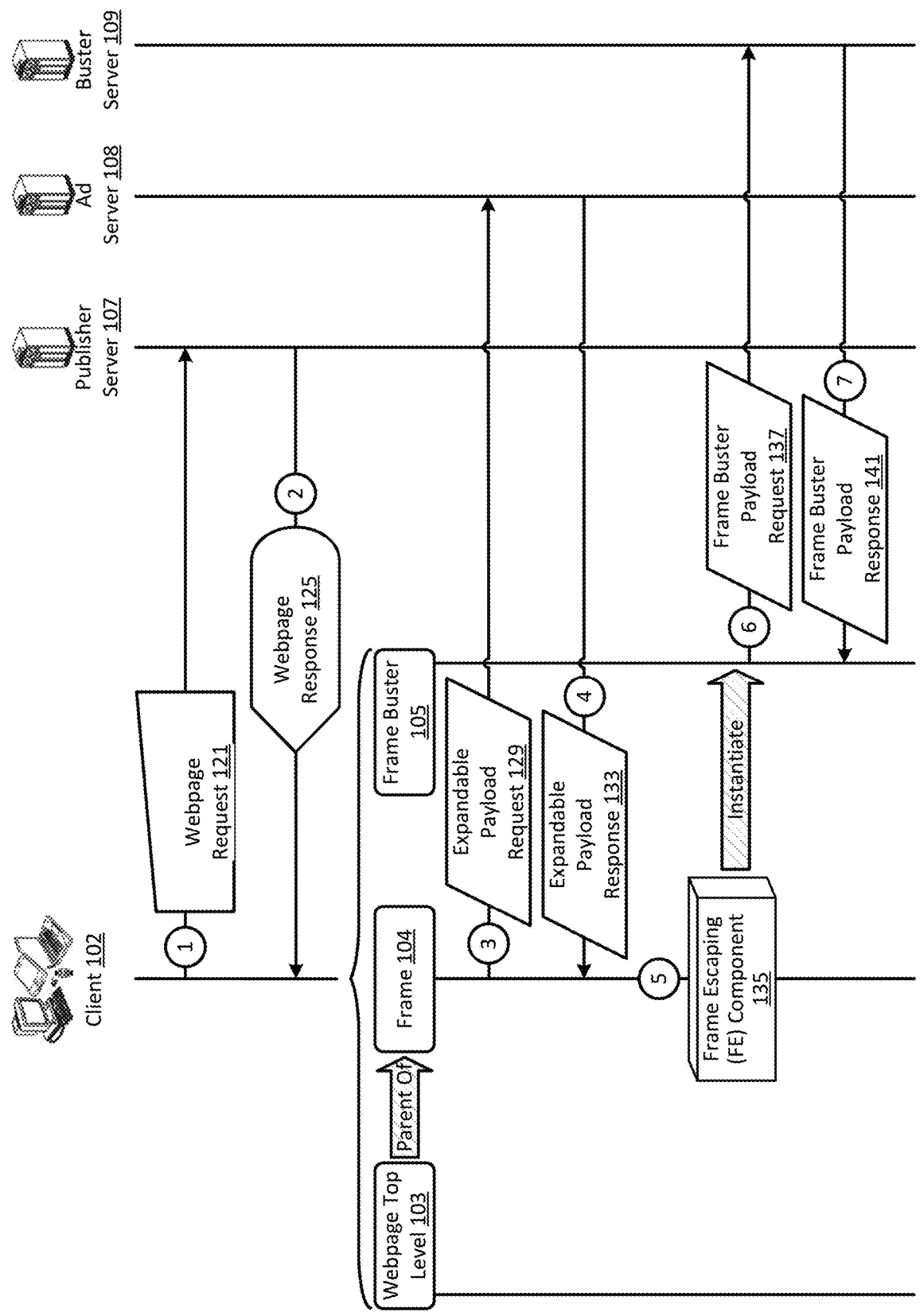
FIGURE 1A: SBWC DATA FLOW

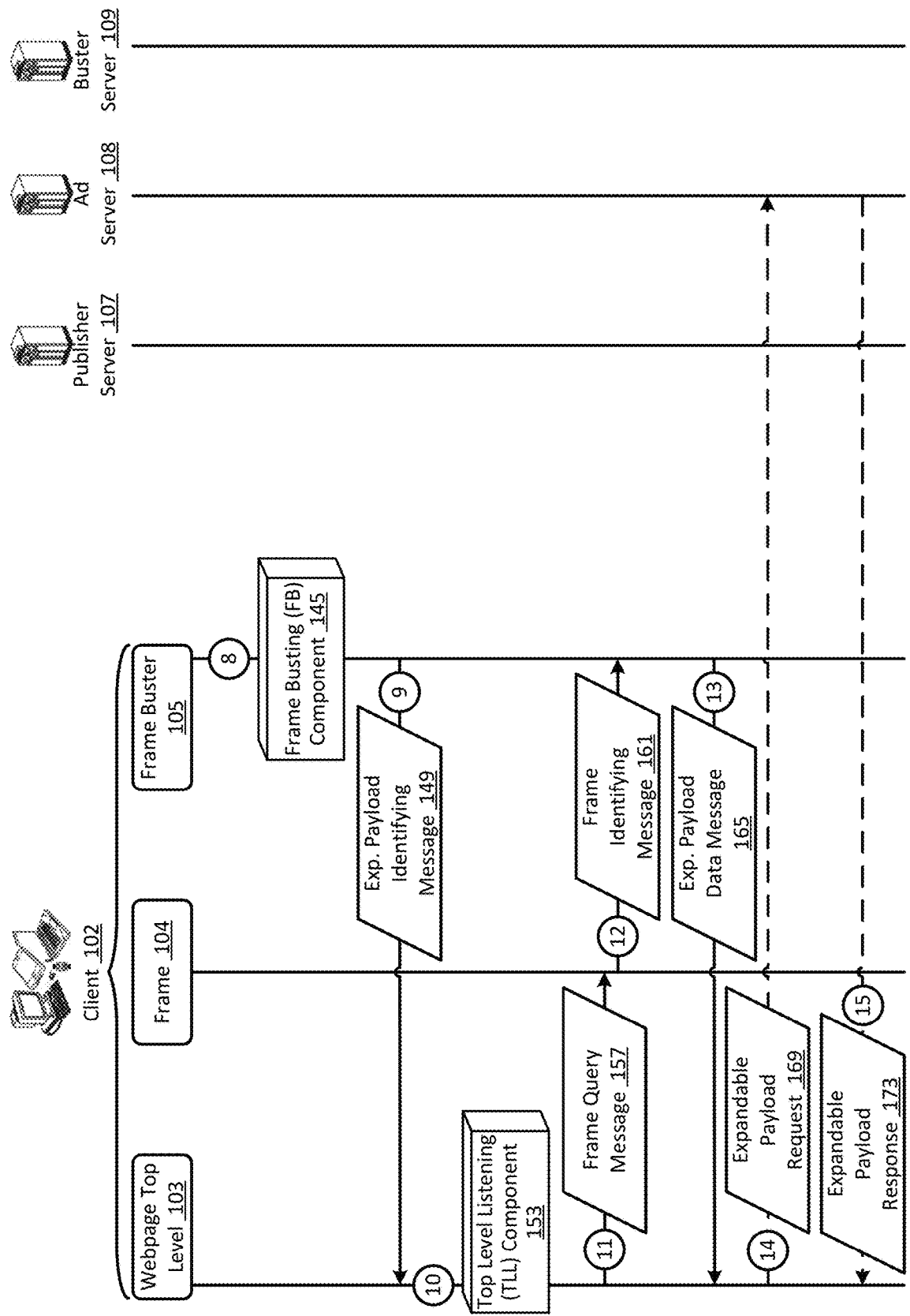

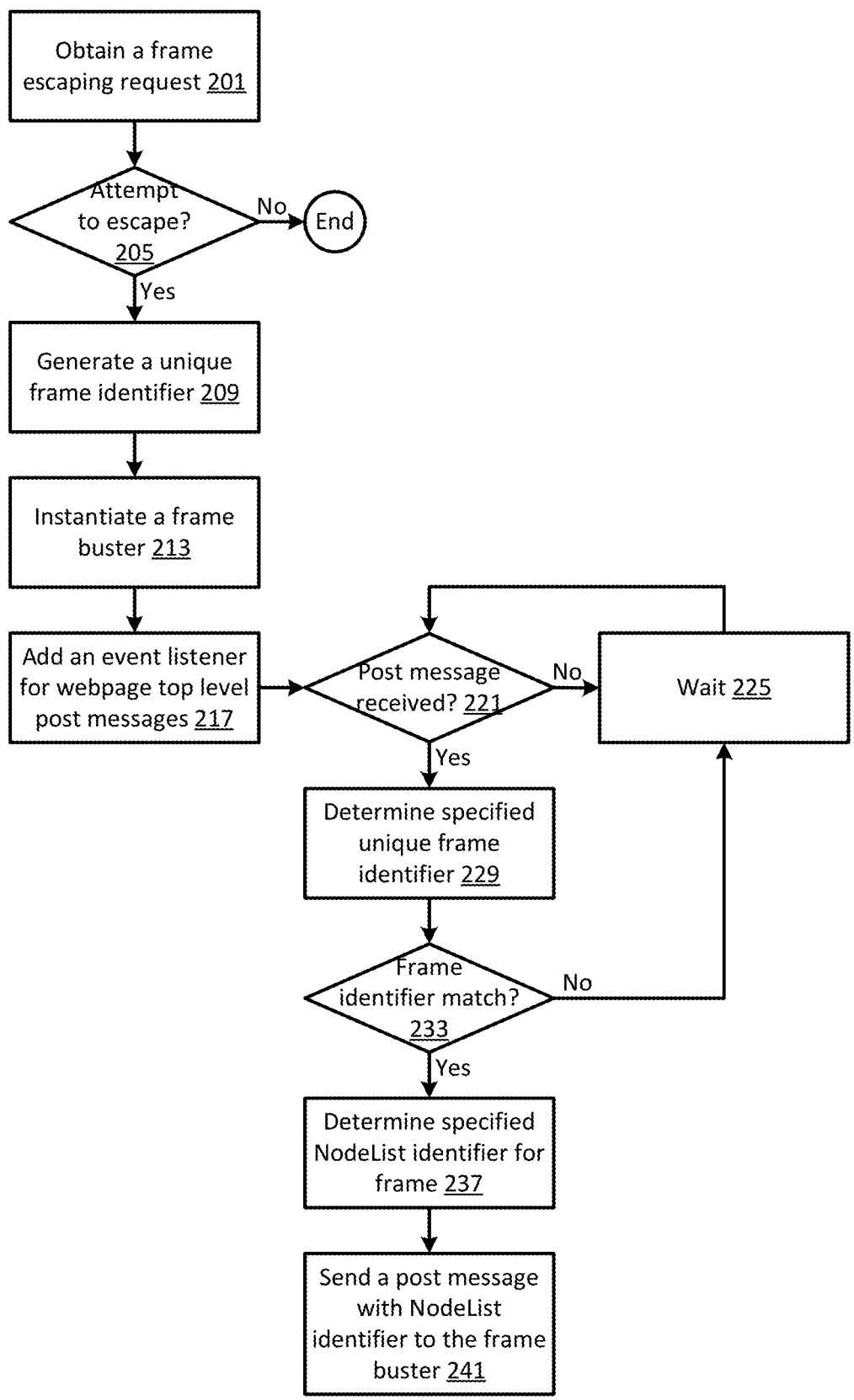
FIGURE 2: SBWC FE COMPONENT

FIGURE 3: SBWC FB COMPONENT
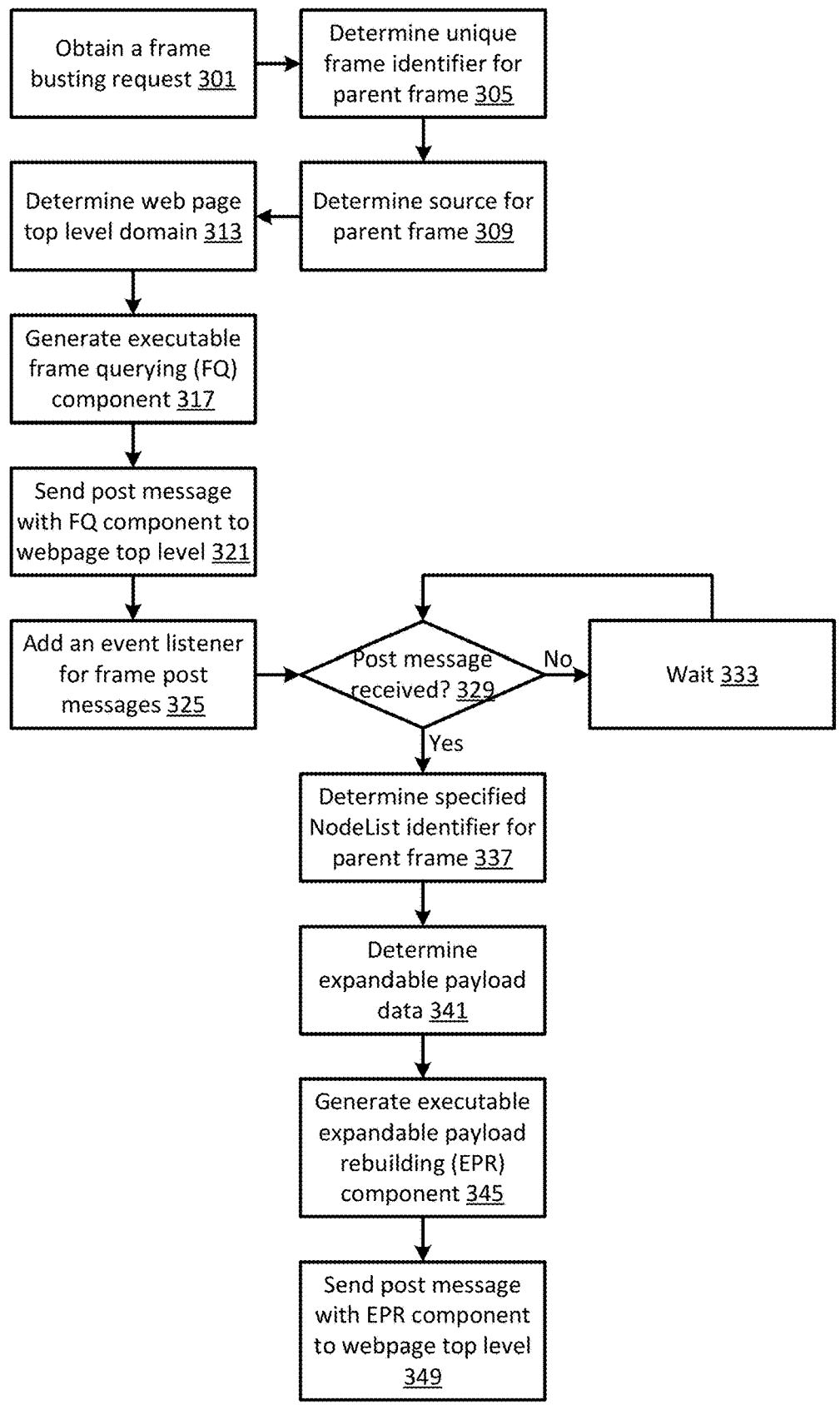

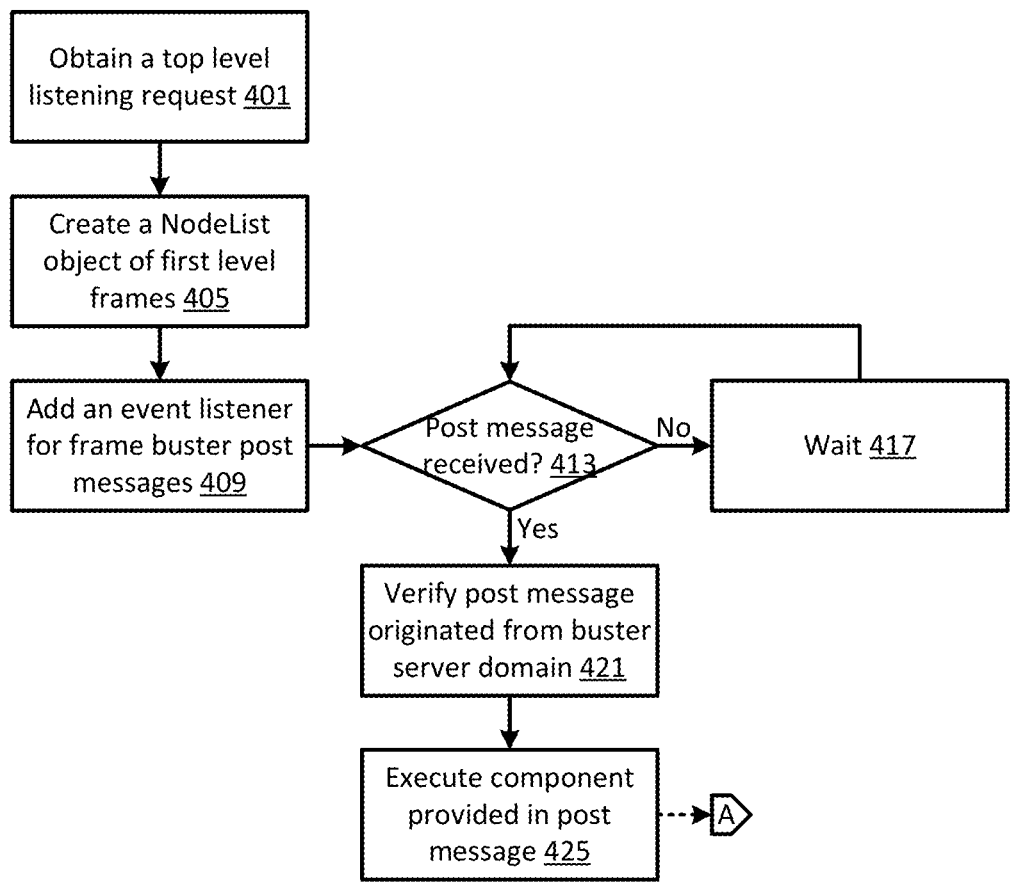
FIGURE 4: SBWC TLL COMPONENT

FIGURE 5: SBWC FQ COMPONENT
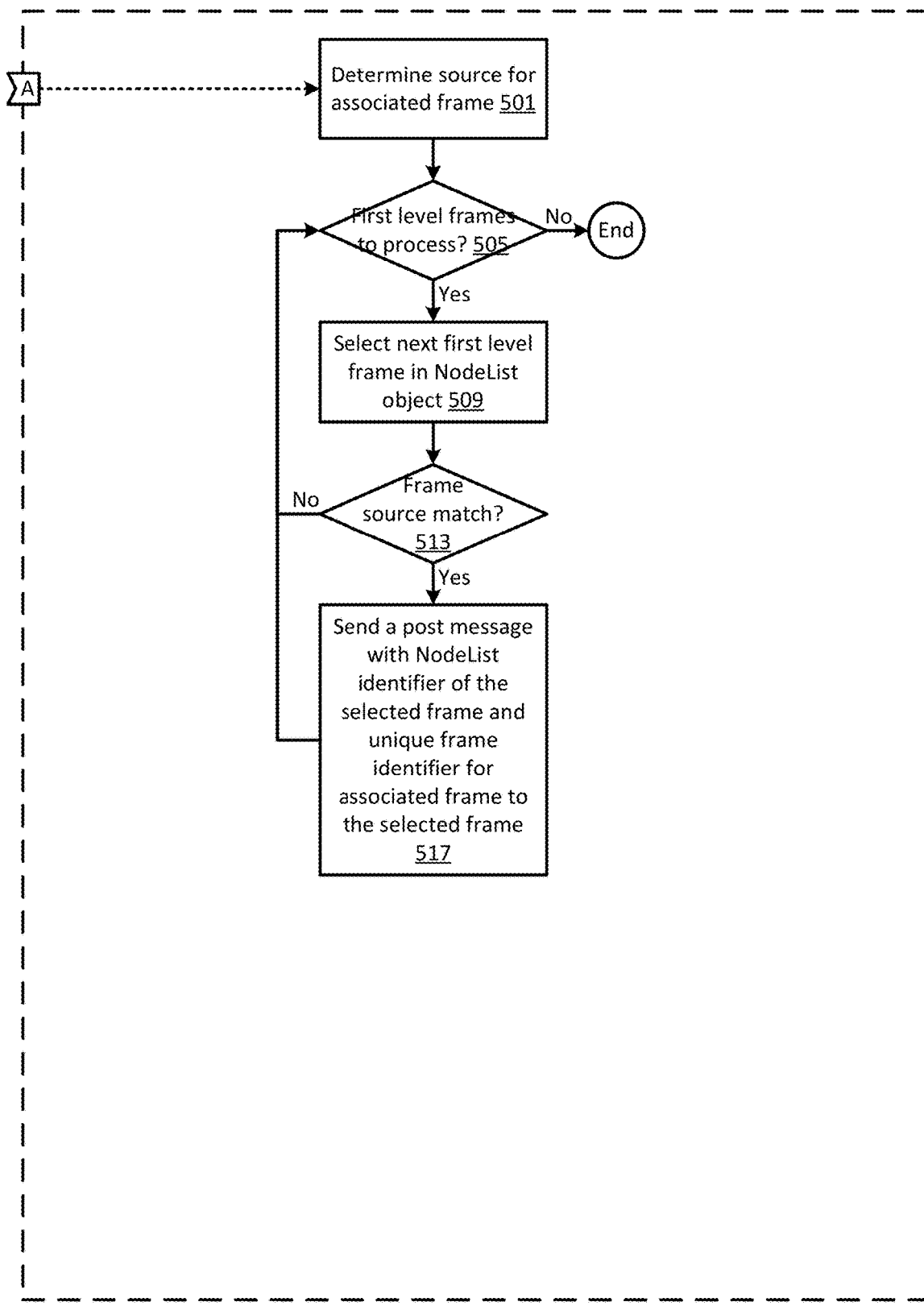

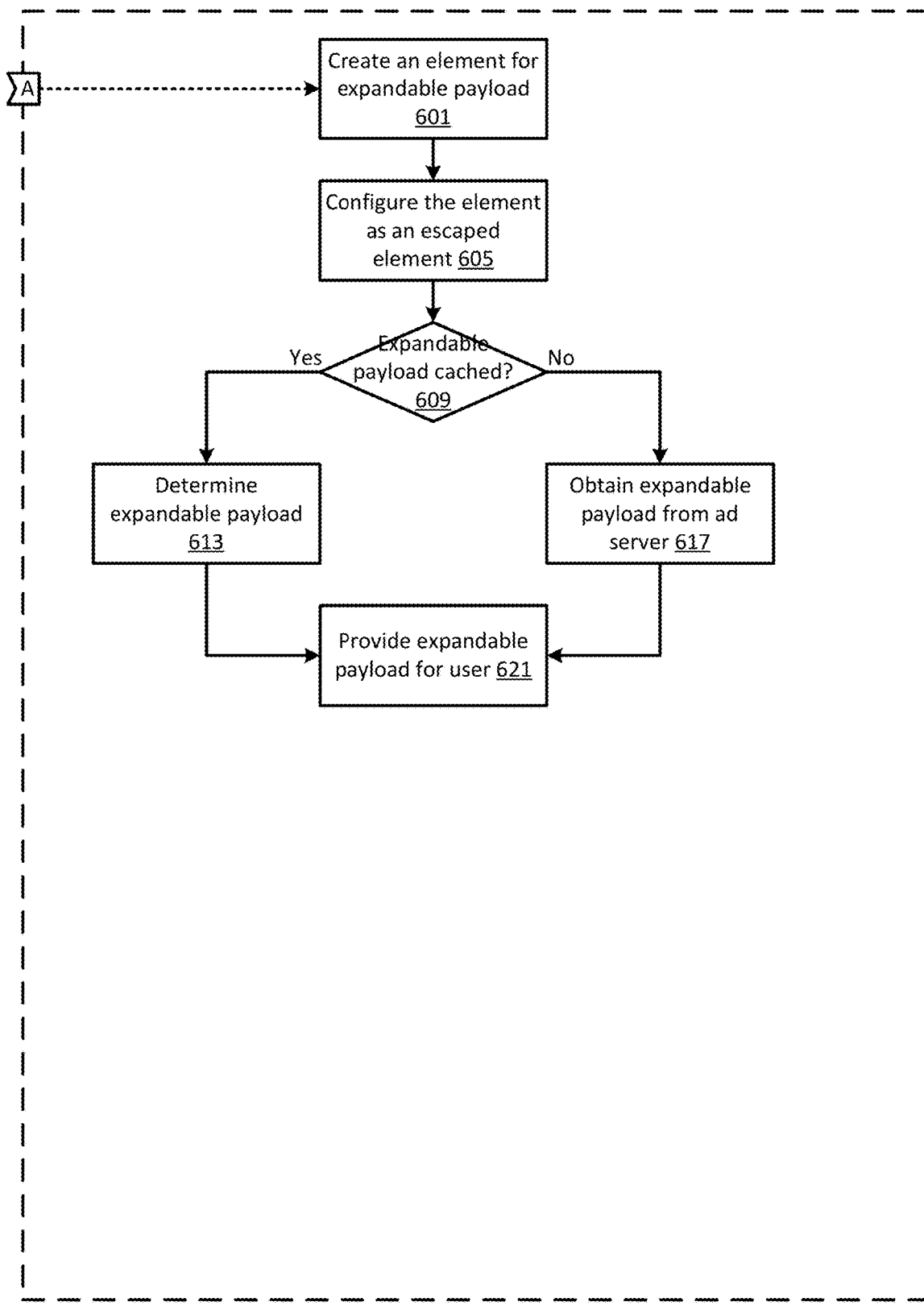

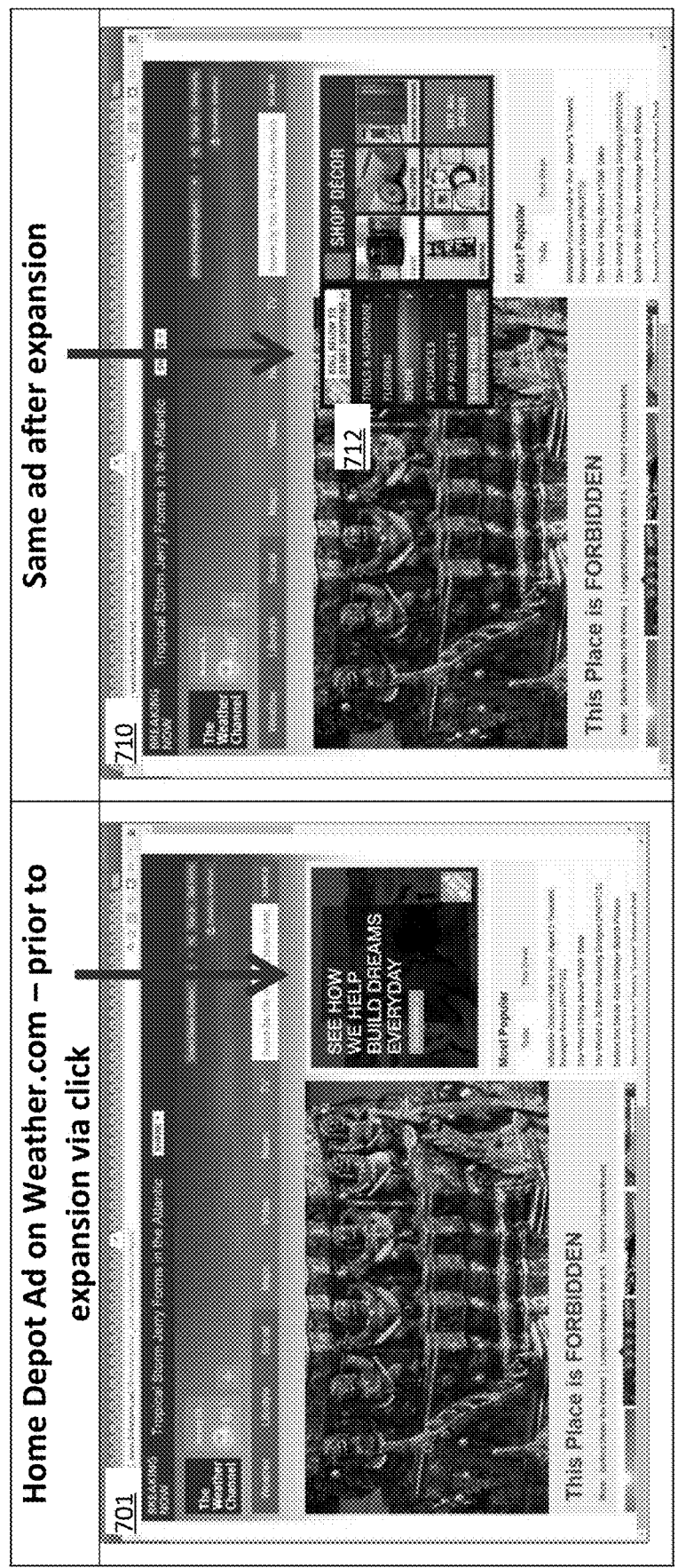
FIGURE 7: SBWC SCREENSHOT

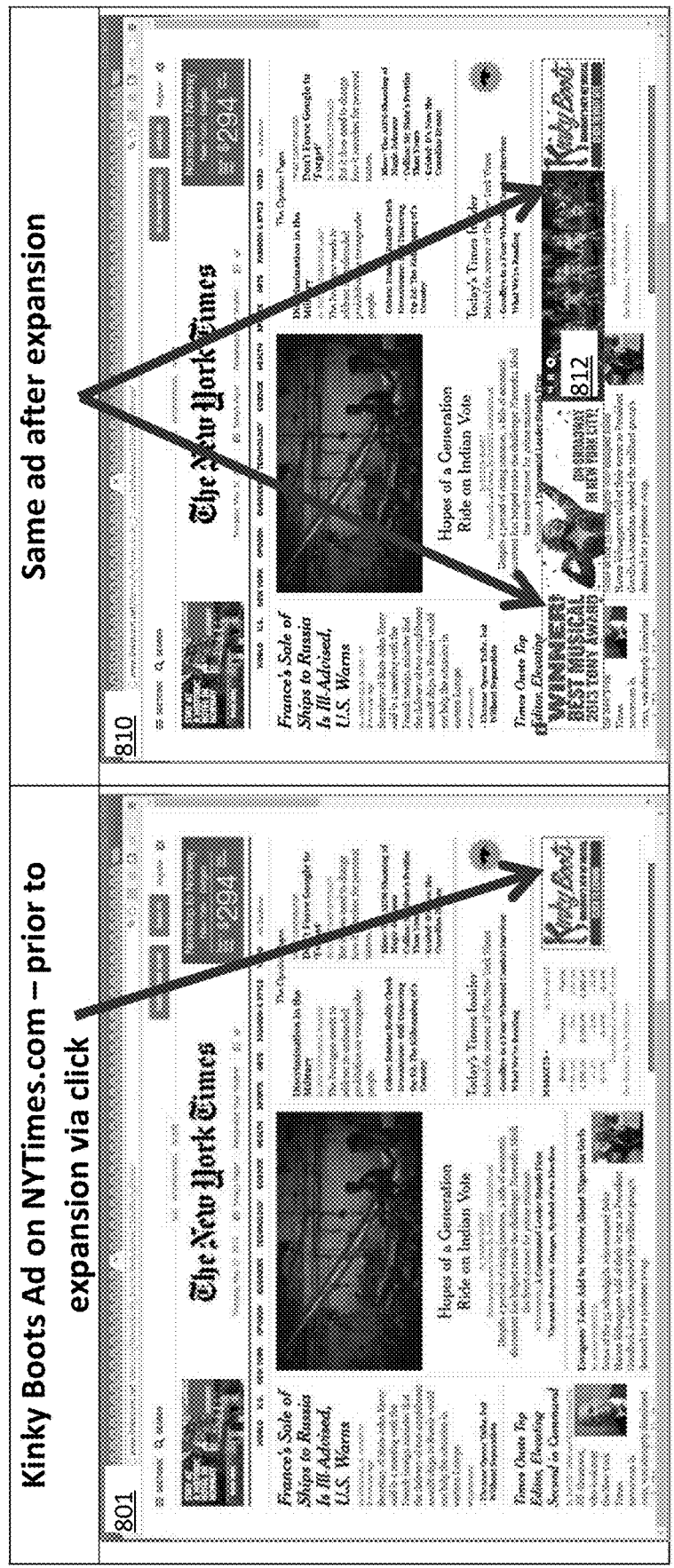
FIGURE 8: SBWC SCREENSHOT

FIGURE 9: SBWC Controller
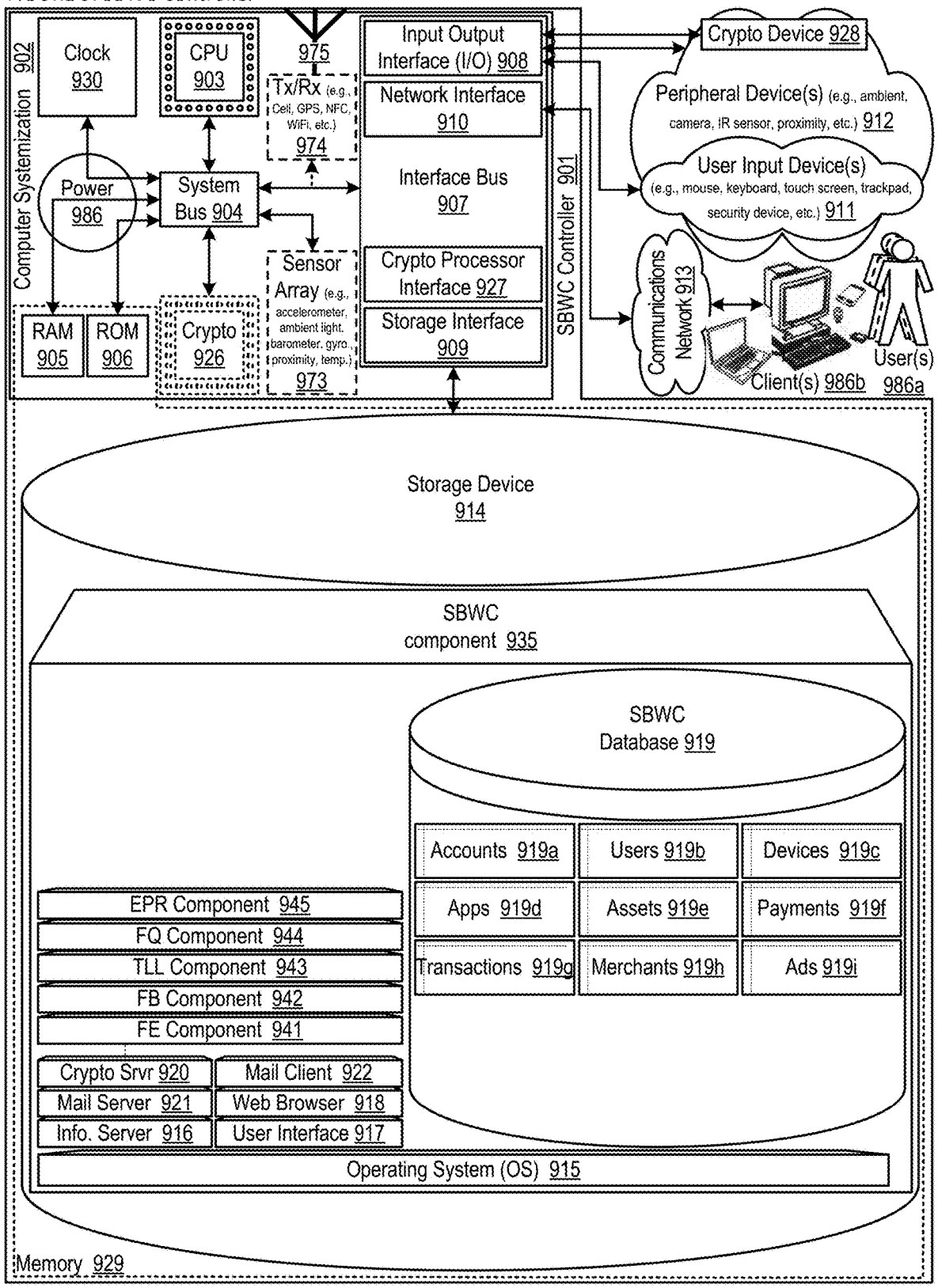

SUPRA BOUNDARY WEB COMPOSITOR APPARATUSES, METHODS AND SYSTEMS

PRIORITY CLAIM

Applicant hereby claims benefit to priority under 35 USC 120 as a continuation of U.S. patent application Ser. No. 15/709,096, filed Sep. 19, 2017, entitled "Supra Boundary Web Compositor Apparatuses, Methods and Systems"; and which in turn claims benefit to priority under 35 USC § 119 as a non-provisional conversion of: U.S. provisional patent application Ser. No. 62/396,796, filed Sep. 19, 2016, entitled "Supra Boundary Web Compositor Apparatuses, Methods and Systems,"; U.S. provisional patent application Ser. No. 62/396,799, filed Sep. 19, 2016, entitled "Supra Boundary Web Compositor Apparatuses, Methods and Systems,".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned applications are herein expressly incorporated by reference.

FIELD

The present innovations generally address web frame and graphic compositing, and more particularly, include Supra Boundary Web Compositor Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Web technologies allow for graphic display. Web servers host web page data that is transferred to web browsers operated by users. The web browsers interpret the web page data for rendering both graphics and text.

BRIEF DESCRIPTION OF THE DRAWINGS

Appendices and/or drawings illustrating various, non-limiting, example, innovative aspects of the Supra Boundary Web Compositor Apparatuses, Methods and Systems (hereinafter "SBWC") disclosure, include:

FIGS. 1A-1B show a datagraph diagram illustrating embodiments of a data flow for the SBWC;

FIG. 2 shows a logic flow diagram illustrating embodiments of a frame escaping (FE) component for the SBWC;

FIG. 3 shows a logic flow diagram illustrating embodiments of a frame busting (FB) component for the SBWC;

FIG. 4 shows a logic flow diagram illustrating embodiments of a top level listening (TLL) component for the SBWC;

FIG. 5 shows a logic flow diagram illustrating embodiments of a frame querying (FQ) component for the SBWC;

FIG. 6 shows a logic flow diagram illustrating embodiments of an expandable payload rebuilding (EPR) component for the SBWC;

FIG. 7 shows a screenshot diagram illustrating embodiments of the SBWC;

FIG. 8 shows a screenshot diagram illustrating embodiments of the SBWC; and

FIG. 9 shows a block diagram illustrating embodiments of a SBWC controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Supra Boundary Web Compositor Apparatuses, Methods and Systems (hereinafter "SBWC") transforms webpage request inputs, via SBWC components (e.g., FE, FB, TLL, FQ, EPR, etc. components), into composited expandable element outputs. The SBWC components, in various embodiments, implement advantageous features as set forth below.

Introduction

Advertisers on the Internet have utilized "Rich Media Expandable Ads" as one of the many choices of ad formats available to them. According to the industry trade association the IAB (Interactive Advertising Bureau), "Rich Media" is defined as "advertisements with which users can interact (as opposed to solely animate) in a web page format." Further, an "Expandable" ad is one that increases in size beyond its original dimensions when it is selected via a mouse-over or a click or a tap, so that it can present a larger footprint with additional information or additional interactive functionality.

Expandable ads are very desirable for advertisers because they provide an ad presence that can be made larger, more attention-getting, more engaging, and more interactive—and in the case of SBWC, more useful to the customer because it can present a cascading navigation menu (e.g., of hundreds of clickable choices)—which typically drives higher performance in terms of customer engagement, click-through and conversion (e.g., online sales or lead-generations). In SBWC's case, these improvements have ranged from 2× to 17× in click-throughs and conversions, as measured by many rigorous A/B tests (e.g., 50/50 alternating rotations of a SBWC ad versus a competitor's ad on the same websites, same page placements, same times of day, etc.). See FIGS. 7 and 8 for examples of how navigable menus may expand out of a preset advertising block on a web page.

However, one major obstacle to the widespread use of expandable ads is that many "publisher websites" (e.g., websites that permit ads to appear on them) use a technique for hosting ads knows as an iframe, which limits the ad to remaining within its original borders and prevents any expansion. When an expandable (e.g., JavaScript) ad is served in an iframe, it is subject to the cross origin restrictions browsers have in place for security purposes. When a JavaScript ad is served it is placed in a child iframe on a different domain (e.g., www.A.com) than the parent publisher webpage (e.g., www.B.com). The two mismatched domains prevent a JavaScript based ad from communicating with the parent publisher webpage. This security feature of browsers prevents execution of JavaScript ad code on the parent publisher web site. The reason that many publishers employ iframes is to protect the user experience on their website by restricting the ad from communicating technologically with the rest of the page, thus preventing the ad from adversely affecting the publisher's page (e.g., by replacing the publisher's content with unauthorized content). But an unintended consequence of this is that the ad cannot expand, even if the user deliberately tries to initiate the expansion by mousing over the ad or clicking on it or tapping on it.

Many websites do want to accept expandable ads, since their business models are ad-supported and they know that many advertisers want to utilize expandable ads, so that the more ad types they can accept, the more competition they will have amongst the ads bidding for their available ad inventory, and the more money they can make. For example, a very large number of the publisher sites that have signed up with Google's Ad Exchange ("AdX") have declared to Google that they accept expandable ads—but unfortunately they have not actually installed the software kit that Google provides them that will allow expandable ads to work even though their sites use iframes. By some estimates, as many as 80% of Google's publishers do not in fact support expandable ads.

The SBWC provides a more elegant solution for supporting expandable ads. In one embodiment, the SBWC provides a mechanism that allows publishers to support expandable ads without having to install anything locally (e.g., a file on the publisher's server) and facilitates hosting of expandable ads (e.g., distributed by an ad exchange such as AdX, OpenX, Index Exchange, AppNexus) without having to worry whether their iframes will thwart the expansion functionality. This also saves ad exchanges the time and effort to enforce compliance by mass-mailing reminders to all publishers, not to mention the problem that as a practical matter it would be nearly impossible to achieve 100% compliance (e.g., every publisher would have to install the file on every domain (e.g., www.B.com) and subdomain (e.g., subdomain1.B.com, subdomain2.B.com, subdomain3.B.com) from which they serve webpages).

One reason it is not practical (e.g., for Rich Media vendors, for advertisers, for ad distributors/exchanges) to rely on publishers installing a file on their servers in a programmatic advertising environment (a.k.a. "Real-Time Bidding" or "RTB" environment) is because in that environment the advertiser seldom knows in advance where its ads are going to appear: instead the ads are placed via an "exchange" environment (e.g., like a stock exchange), which automatically matches bids and offers from many different sources and then places an ad automatically on any website where the bid and the offer match each other (e.g., and where the match otherwise conforms to the targeting parameters specified in advance by the parties involved). Thus, unless all publishers install the file on their servers, the advertiser cannot be sure that its expandable ad will be able to expand. Therefore, it is a significant breakthrough to devise a mechanism that universally enables support for expandable ads without requiring any deliberate action on the part of any publishers.

In one implementation, this mechanism is a centralized mechanism that allows ads to expand because it allows an ad to communicate with the rest of the publisher's page and therefore expand beyond its original borders, instead of being locked into the iframe. For example, it may be served centrally by an ad exchange through one or more existing mechanisms (e.g., the iframe escaping solution code may be added to any of Google's AdX scripts publishers install on their pages when they want to serve Google ads, the iframe escaping solution code may be added to the ad tag script Google creates within their publisher console), and added (e.g., a short snippet of JavaScript code) to the top level frame of the publisher's webpage. It is secure because it may communicate with either a dedicated frame buster domain or with an ad exchange domain (e.g., if the ad exchange is hosting the code) to allow the iframe escape. That keeps communication within the trusted domains.

In one embodiment, the iframe escaping solution uses a technique to establish communication with the parent publisher page called post messaging. Messages can be sent between iframes on different domain names using post messages. In one implementation, the publisher page may be listening for post messages from its child iframes (e.g., via the short snippet of JavaScript code). The publisher page may trust the post messages it is receiving because they are accepted if they are from a trusted domain name. Any post messages not from the trusted domain name may be ignored. The post messages are sent back and forth between the child iframe and the parent top level frame until the ad iframe is located on the parent publisher page. Once the ad iframe has been identified it is then able to execute JavaScript code on the publisher page as it may be trusted. In one implementation, the ad may be rebuilt in the top level frame directly above (e.g., via the CSS z-index property) the iframe on the publisher's webpage. Being on top of the iframe instead of inside it allows the ad to expand.

The significance of the SBWC's extra-territorial compositing mechanism goes far beyond ad distributors/exchanges (e.g., AppNexus, Google, Index Exchange, OpenX). This approach could be utilized not only by vendors of expandable ads, but by information portals and widget makers, or anyone who wants to provide data compositing to an area larger than originally allocated.

SBWC

FIGS. 1A-1B show a datagraph diagram illustrating embodiments of a data flow for the SBWC. In FIGS. 1A-1B, dashed lines indicate data flow elements that may be more likely to be optional. In FIGS. 1A-1B, a client 102 may send a webpage request 121 to a publisher server 107 to obtain a content page (e.g., a weather forecast, a news story). For example, the client may be a desktop, a laptop, a tablet, a smartphone, and/or the like that is executing a client application. In one implementation, the webpage request may include data such as a request identifier, a content page identifier, and/or the like. In one embodiment, the client may provide the following example webpage request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Apptication/XML
Content-Length: 667
```

```
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>SBWC.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <webpage_request>
        <request_identifier>ID_request_1</request_identifier>
        <content_page_identifier>https://www.publisher.com/webpage.html</content_page_
```

```
identifier>
    </webpage_request>
</auth_request>
```

The publisher server may send a webpage response 125 with the requested content page to the client. For example, the client may display the content page to a user of the client. The content page may comprise a plurality of elements including a parent webpage top level (e.g., a top level frame) 103 and a child frame (e.g., an iframe) 104. In one implementation, the webpage top level may include a top level listening (TLL) component (e.g., a short snippet of JavaScript code).

The frame may send an expandable payload request 129 to an ad server 108. For example, this iframe may request an expandable display payload (e.g., an expandable ad) from a URL specified in its src attribute (e.g., https://www.ads.com/ad.php?adID=12345).

The ad server may send an expandable payload response 133 with the requested expandable ad page to the client. For example, the client may display the expandable ad page to the user of the client in the frame. The expandable ad page may be restricted to remaining within the borders of the iframe and may not be able to expand.

A frame escaping (FE) component 135 (e.g., provided via the expandable payload response) may instantiate a frame buster (e.g., a child iframe of the frame) element 105, process post messages from the webpage top level, send post messages to the frame buster, and/or the like to facilitate the iframe escaping solution. See FIG. 2 for additional details regarding the FE component.

The frame buster may send a frame buster payload request 137 to a buster server 109. For example, this iframe may request a frame buster payload (e.g., from a trusted frame buster domain) from a URL specified in its src attribute (e.g., https://www.FrameBuster.com/buster.html?adID=12345). The buster server may send a frame buster payload response 141 with the requested frame buster page to the client.

A frame busting (FB) component 145 (e.g., provided via the frame buster payload response) may process post messages from the frame, send post messages to the webpage top level, and/or the like to facilitate the iframe escaping solution. See FIG. 3 for additional details regarding the FB component.

The frame buster may send an expandable payload identifying message 149 to the webpage top level to facilitate querying frames to determine which frame contains the expandable ad. In one implementation, the expandable payload identifying message may be a post message that includes data such as an origin (e.g., domain associated with the frame sending the post message), target origin (e.g., domain associated with the frame that should receive the post message), data (e.g., data to be sent to the target frame), and/or the like. For example, the data field may include a frame querying (FQ) component (e.g., which may include data regarding the frame such as a unique frame identifier, a source, and/or the like). See FIG. 5 for additional details regarding the FQ component. In one embodiment, the frame buster may provide the following example expandable payload identifying message including XML-formatted data, as provided below:

```
<post_message>
    <origin>https://www.FrameBuster.com</origin>
    <targetOrigin>https://www.publisher.com</targetOrigin>
    <data>executable FQ component</data>
</post_message>
```

The TLL component 153 may listen for post messages from the frame buster and/or execute components provided via post messages. See FIG. 4 for additional details regarding the TLL component.

The webpage top level may send a frame query message 157 to the frame to facilitate determining which frame contains the expandable ad. In one implementation, the frame query message may be a post message that includes data such as an origin (e.g., domain associated with the frame sending the post message), target origin (e.g., domain associated with the frame that should receive the post message), data (e.g., data to be sent to the target frame), and/or the like. For example, the data field may include a NodeList identifier, a unique frame identifier, and/or the like. In one embodiment, the webpage top level may provide the following example frame query message including XML-formatted data, as provided below:

```
<post_message>
    <origin>https://www.publisher.com</origin>
    <targetOrigin>https://www.ads.com</targetOrigin>
    <data>
        <node_list_id>Nodelist ID of the frame</node_list_id>
        <unique_frame_id>unique frame ID of the
        frame</unique_frame_id>
    </data>
</post_message>
```

The frame may send a frame identifying message 161 to the frame buster to provide the matching NodeList identifier of the frame to the frame buster. In one implementation, the frame identifying message may be a post message that includes data such as an origin (e.g., domain associated with the frame sending the post message), target origin (e.g., domain associated with the frame that should receive the post message), data (e.g., data to be sent to the target frame), and/or the like. For example, the data field may include a NodeList identifier, and/or the like. In one embodiment, the frame may provide the following example frame identifying message including XML-formatted data, as provided below:

```
<post_message>
    <origin>https://www.ads.com</origin>
    <targetOrigin>https://www.FrameBuster.com</targetOrigin>
    <data>
        <node_list_id>NodeList ID of the frame</node_list_id>
    </data>
</post_message>
```

The frame buster may send an expandable payload data message 165 to the webpage top level to facilitate providing expandable display payload for the user. In one implementation, the expandable payload data message may be a post message that includes data such as an origin (e.g., domain associated with the frame sending the post message), target origin (e.g., domain associated with the frame that should receive the post message), data (e.g., data to be sent to the target frame), and/or the like. For example, the data field may include an expandable payload rebuilding (EPR) component (e.g., which may include data regarding the frame). See FIG. 6 for additional details regarding the EPR component. In one embodiment, the frame buster may provide the following example expandable payload data message including XML-formatted data, as provided below:

```
<post_message>
    <origin>https://www.FrameBuster.com</origin>
    <targetOrigin>https://www.publisher.com</targetOrigin>
    <data>executable EPR component</data>
</post_message>
```

The webpage top level may send an expandable payload request 169 to the ad server to facilitate rebuilding the expandable ad in the webpage top level (e.g., above the frame). For example, if the expandable ad page was not cached, it may be retrieved from the ad server. In another example, additional ad data may be retrieved.

The ad server may send an expandable payload response 173 with the requested data to the client. For example, the client may display the expandable ad page to the user of the client in the webpage top level. The expandable ad page may expand (e.g., if the user tries to initiate the expansion by mousing over the expandable ad or clicking on it or tapping on it).

FIG. 2 shows a logic flow diagram illustrating embodiments of a frame escaping (FE) component for the SBWC. In FIG. 2, a frame escaping request may be obtained at 201. For example, the frame escaping request may be obtained when an initialization function of an expandable display payload (e.g., of an expandable ad (e.g., a JavaScript object)) calls the FE component to facilitate the iframe escaping solution.

A determination may be made at 205 whether to attempt to escape from a frame. For example, an attempt to escape may be made if it is determined that the expandable ad is in an iframe. In one implementation, the determination whether to attempt to escape from the frame may be implemented as follows:

```
//bool that determines whether to attempt to escape
var go = false;
//Determine the top level domain name and the first level nested iframe
//the expandable ad lives in on the top frame. This code can go 4 nested iframes
deep.
if (this.checkIframeAccess(parent)){
    if (parent.parent == top){
        this.parent_domain = window.location.protocol+"//"+
            this.extractDomain(parent.document.referrer);
        this.first_level_iframe = parent;
        go = true
    } else {
        if (this.checkIframeAccess(parent.parent)){
            if (parent.parent.parent == top){
                this.parent_domain = window.location.protocol+
                    "//"+this.extractDomain(parent.parent.document.referrer);
                this.first_level_iframe = parent.parent;
                go = true
            }else{
                if (this.checkIframeAccess(parent.parent.parent)){
                    if (parent.parent.parent.parent == top){
                        this.parent_domain = window.location.protocol+"//"+
                            this.extractDomain(parent.parent.parent.document.referrer);
                        this.first_level_iframe = parent.parent.parent;
                        go = true
                    }
                }
            }
        }
    }
}
this.checkIframeAccess = function(ifr) {
    try {
        var l = ifr.location.toString( );
        if(typeof l == 'undefined')
            return false
        else
            return true;
    } catch( e ) {
        return false;
    }
}
this.extractDomain = function(url){
    var domain;
    //find & remove protocol (http, ftp, etc.) and get domain
    if (url.indexOf("://") > -1)
        domain = url.split('/')[2];
    else
```

```
        domain = url.split('/')[0];
    //find & remove port number
        domain = domain.split(':')[0];
        return domain;
}
```

If it is determined that escape should be attempted, a unique frame identifier of the frame (e.g., an iframe that contains the expandable ad) may be generated at 209. For example, the unique frame identifier may be a random number. In one implementation, the unique frame identifier may be generated as follows:

```
//create a random number ID between 1 and a billion used to identify
//the iframe this ad is sitting in.
var iframe_id = Math.floor((Math.random( ) * 1000000000) + 1);
//set the id to the string type
iframe_id = iframe_id.toString( );
```

A frame buster (e.g., a child iframe of the expandable ad iframe) may be instantiated at 213. For example, the frame buster may be instantiated to facilitate utilizing a FB component. The frame buster may be provided (e.g., via the window.name attribute) with data such as the unique frame identifier, the source of the first level expandable ad iframe, the domain of the webpage top level, the source of the initialization function of the expandable ad object, and/or the like. The src attribute of the frame buster may be set to a webpage at a trusted frame buster domain containing code of the FB component. In one implementation, the frame buster may be instantiated as follows:

```
//create a hidden iframe that will hold a buster iframe
this.buster_frame = document.createElement('iframe');
//Set the variables to send to the buster iframe in the window.name
attribute.
//Use a custom |L-|||-S| delimiter to parse out the variables later in the
buster
iframe.
this.buster_frame.name =
    iframe_id+"|L-|||-S|"+
    this.first_level_iframe.location.href+"|L-|||-S|"+
    this.parent_domain+"|L-|||-S|"+
    SB.initscript.src+"|L-|||-S|"; //SB is the expandable ad object
    containing
associated ad data and/or functions
//set the buster frame source to the buster domain and pass in the adID
this.buster_frame.src = window.location.protocol+
        '//www.FrameBuster.com/buster.html?adID='+SB.adID;
//add the buster iframe to the expandable ad iframe's body
document.body.appendChild(this.buster_frame);
```

An event listener for webpage top level post messages may be added (e.g., to the first level expandable ad iframe) at 217. For example the event listener may process messages received from the webpage top level. In one implementation, the event listener may be added as follows:

```
//used for JavaScript scoping.
var that = this;
// First level nested child frame receives a post message from the webpage top
level
// Publisher frame. The ls$iframes NodeList id and iframe_id are passed into
// this listener. Look at the iframe_id passed in the message data and check for
// a match to this expandable ad's iframe_id.
this.first_level_iframe.addEventListener('message',function(e){
    //split the data to get the frame id and the NodeList id
    var data_parts = e.data.split("|");
    //check if the iframe_id passed back from the webpage top level matches the
generated unique
    //frame identifier. If there is a match, send the buster iframe a message with
the webpage top
    //level ls$iframes NodeList id. Set the allowed target to www.FrameBuster.com
to prevent elements
    //other than the buster iframe from accepting this message.
    if (data_parts[1] == iframe_id)
        that.buster_frame.contentWindow.postMessage(
            data_parts[0], //webpage top level ls$iframes NodeList array id that
matches the ad's first level iframe
            window.location.protocol+'//www.FrameBuster.com' //available to the buster
domain, but not other domains
        );
});
```

A determination may be made at 221 whether a post message was received from the webpage top level. For example, the event listener may be configured to process received post messages (e.g., as shown in the example above). If a post message was not received, the FE component may wait at 225 until a post message is received.

If a post message was received, a unique frame identifier specified in the post message may be determined at 229. In one implementation, data provided in the post message may be parsed (e.g., using JavaScript commands) to determine the unique frame identifier.

A determination may be made at 233 whether the specified unique frame identifier matches the unique frame identifier of the iframe that contains the expandable ad. If the frame identifiers match, a NodeList identifier of the first level expandable ad iframe may be determined at 237. In one implementation, data provided in the post message may be parsed (e.g., using JavaScript commands) to determine the NodeList identifier.

A post message with the determined NodeList identifier may be sent to the frame buster at 241. In one implementation, the post message may be sent using the window.postMessage( ) JavaScript function.

FIG. 3 shows a logic flow diagram illustrating embodiments of a frame busting (FB) component for the SBWC. In FIG. 3, a frame busting request may be obtained at 301. For example, the frame busting request may be obtained when a script of a frame buster payload is executed (e.g., when a frame buster page is loaded into a frame buster iframe associated with an expandable ad).

A unique frame identifier for a parent frame (e.g., an expandable ad iframe) may be determined at 305. For example, the window.name attribute may be parsed (e.g., using JavaScript commands) to determine the unique frame identifier. In one implementation, the unique frame identifier may be determined as follows:

```
//Split up the window name attribute into a usable array. Do this by
//splitting the data with the custom |L-|||-S| delimiter.
var Data = self.name.split("|L-|||-S|");
var data_frame_id = Data[0];
```

A source for the parent frame (e.g., a first level expandable ad iframe) may be determined at 309. For example, the window.name attribute may be parsed (e.g., using JavaScript commands) to determine the source. In one implementation, the source may be determined as follows:
    var data_src=Data[1];

A webpage top level domain may be determined at 313. For example, the window.name attribute may be parsed (e.g., using JavaScript commands) to determine the domain of the webpage top level. In one implementation, the webpage top level domain may be determined as follows:
    var data_top_level_domain=Data[2];

An executable frame querying (FQ) component may be generated at 317. For example, the FQ component may facilitate querying frames to determine which frame contains the expandable ad. In one implementation, the FQ component may be generated as follows:

```
//Create a string of JavaScript code to send to the webpage top level Publisher
//frame. This code (FQ component) is executed when the Publisher frame receives
the message.
var passed_escape_js_code =
    //set the LSESCAPE variable to tag this code as buster code
    "var LSESCAPE = '';"+
    //set the src variable to the source of the first level iframe the expandable
ad is living in.
    "var src = '"+data_src+"';"+
    //loop through the ls$iframes NodeList set in a TLL component
    "for (var node_list_id = 0; node_list_id < ls$iframes.length; node_list_id++)
{"+
        //Check if the source of the first level iframe matches the source of the
iframe
        //in this loop iteration. Continue to next iteration if the source does not
match.
        //Do this to prevent unwanted messages from going to iframes that do not
contain the expandable ad.
        "if (src != ls$iframes[node_list_id].src) continue;"+
        //send the node_list id and the unique frame identifier back into a child
iframe to determine
        //if this iteration is the expandable ad iframe.
        "ls$iframes[node_list_id].contentWindow.postMessage("+
            "node_list_id+'|'+data_frame_id+"', '*' "+
    "); "+
    "}";
```

A post message with the generated FQ component may be sent to the webpage top level at 321. In one implementation, the post message may be sent using the window.postMessage( ) JavaScript function as follows:

```
//send the post message to the webpage top level Publisher Frame
//set the target origin to the publisher domain name to prevent other
elements
from receiving the message
window.top.postMessage(passed_escape_js_code,
data_top_level_domain);
```

An event listener for frame post messages may be added (e.g., to the buster iframe) at 325. For example the event listener may process messages received from the parent frame. In one implementation, the event listener may be added as follows:

```
var data_expandable_ad_initscript = Data[3];
/**
 * Add a Post Message Listener to the buster iframe.
 * This listener is waiting for a message telling it the iframe was located.
 * The data value passed into this listener is the ls$iframes NodeList id that
was matched.
*/
window.addEventListener('message',function(e){
    //Create a string of JavaScript code to send to the webpage top level Publisher
    //frame. This code (EPR component) is executed when the Publisher frame
receives the message.
    var passed_escape_js_code =
        //set the LSESCAPE variable to tag this code as buster code.
        "var LSESCAPE = '';"+
        //set the node_list_id from the message data sent in from the parent frame
        "var node_list_id = '"+e.data+"';"+
        //set a random id used by the expandable ad to find itself when being added
to a page
        "var new_id = Math.floor((Math.random( ) * 10000000) + 1);"+
        //create a JavaScript HTML script tag
        "var s = window.top.document.createElement('script');"+
        //set the type to text/javascript
        "s.type='text/javascript';"+
        //give this script a classname of ls_escaped - used by the expandable ad to
determine it has
        //escaped an iframe.
        "s.className = 'ls_escaped';"+
        "s.setAttribute('escaped', 'true');"+
        "s.id = new_id;"+
        //set the src of the script tag to the expandable ad Init File
        "var src = '"+data_expandable_ad_initscript+"';"+
        "src += '&friendly=false&escape_id='+new_id;"+
        "s.src = src;"+
        //Using the node_list_id add the expandable ad Init Script in front of the
iframe
        //that matched in the ls$iframes NodeList the expandable ad was originally
placed in. The expandable
        //ad then executes its normal process on the webpage top level Publisher
frame and is able to load its menu
        //for full expansion.
        "ls$iframes[node_list_id].parentNode.insertBefore(s,ls$iframes[node_list_id]);";
        //send the post message to the webpage top level Publisher Frame
        //set the target origin to the publisher domain name to prevent other elements
from receiving the message
        window.top.postMessage(passed_escape_js_code, data_top_level_domain);
});
```

A determination may be made at 329 whether a post message was received from the parent frame. For example, the event listener may be configured to process received post messages (e.g., as shown in the example above). If a post message was not received, the FB component may wait at 333 until a post message is received.

If a post message was received, a NodeList identifier for the parent frame specified in the post message may be determined at 337. In one implementation, data provided in the post message may be parsed (e.g., using JavaScript commands) to determine the NodeList identifier for the parent frame.

Expandable payload data may be determined at 341. In one implementation, the source of the expandable ad initialization script may be determined. For example, the window.name attribute may be parsed (e.g., using JavaScript commands) to determine the source of the expandable ad initialization script. In another implementation, other expandable ad attributes (e.g., passed in from the parent frame and utilized for click tracking) may be determined.

An executable expandable payload rebuilding (EPR) component may be generated at 345. For example, the EPR component may facilitate rebuilding the expandable ad in the webpage top level (e.g., above the parent frame).

A post message with the generated EPR component may be sent to the webpage top level at 349. In one implementation, the post message may be sent using the window.postMessage( ) JavaScript function.

FIG. 4 shows a logic flow diagram illustrating embodiments of a top level listening (TLL) component for the SBWC. In FIG. 4, a top level listening request may be obtained at 401. For example, the top level listening request may be obtained when a script of a webpage top level is executed (e.g., when the webpage top level is loaded).

A NodeList object of first level frames may be created at 405. For example, the NodeList object may include first level iframes located on the webpage top level. In one implementation, the NodeList object may be created as follows:

```
// Create a HTML NodeList object of the iframes located on the webpage top level
// Publisher page.
var ls$iframes = window.top.document.getElementsByTagName('iframe');
```

An event listener for frame buster post messages (e.g., from the buster domain) may be added (e.g., to the webpage top level) at 409. For example, the event listener may process messages received from a frame buster. In one implementation, the event listener may be added as follows:

```
/**
 * Add a Post Message Listener to the webpage top level Publisher page.
 * This function is listening for messages from nested cross origin iframes
 * associated with expandable ads.
 */
window.addEventListener('message',function(e){
    //Check the origin of the post message to verify that the post message is from
the www.FrameBuster.com
        //domain name. This code prevents unauthorized use of this message listener.
        if (e.origin != window.location.protocol+"//www.FrameBuster.com") {
            //stop processing if the origin of the message was not www.FrameBuster.com
            return;
        }
        //check if the data received in the message payload is of the type string
        //stop processing if is not a string
        if (typeof e.data != 'string') {
            return;
        }
        //check if the message contains the string "LSESCAPE"
        //this prevents processing of post messages happening within the expandable ads
        //themselves that do not relate to iframe escaping.
        if (e.data.indexOf("LSESCAPE") ==-1) {
            return;
        }
        //Turn the post message data into an executable JavaScript function.
        var ls$escape = Function(e.data);
        //Run the new JavaScript Function.
        ls$escape( );
});
```

A determination may be made at 413 whether a post message was received from a frame buster. For example, the event listener may be configured to process received post messages (e.g., as shown in the example above). If a post message was not received, the TLL component may wait at 417 until a post message is received.

If a post message was received, its origin may be checked to verify that it originated from the buster domain at 421. In one implementation, origin data provided in the post message may be checked against a specified buster domain name (e.g., www.FrameBuster.com) to verify the origin of the post message.

An executable component (e.g., FQ component, EPR component) provided in the post message may be executed at 425. In one implementation, the executable component may be turned into an executable JavaScript function using the Function( ) JavaScript function, and the resulting executable JavaScript function may be executed. See FIG. 5 for additional details regarding the FQ component. See FIG. 6 for additional details regarding the EPR component.

FIG. 5 shows a logic flow diagram illustrating embodiments of a frame querying (FQ) component for the SBWC. In FIG. 5, the source of the first level expandable ad iframe associated with the frame buster that sent the post message may be determined at 501. In one implementation, the source of the first level expandable ad iframe may be specified in the post message.

A determination may be made at 505 whether there remain first level frames to process. In one implementation, each of the first level iframes in the NodeList object may be processed. If there remain first level iframes to process, the next first level iframe in the NodeList object may be selected at 509.

A determination may be made at 513 whether the source of the selected first level iframe matches the source of the first level expandable ad iframe. If it is determined that the frame sources match, a new post message with the NodeList identifier (e.g., item index) of the selected first level iframe and the unique frame identifier associated with the first level expandable ad iframe (e.g., specified in the post message) may be sent to the selected first level iframe. In one implementation, the post message may be sent using the window.postMessage( ) JavaScript function.

FIG. 6 shows a logic flow diagram illustrating embodiments of an expandable payload rebuilding (EPR) component for the SBWC. In FIG. 6, an element (e.g., a JavaScript HTML script tag) for the expandable display payload (e.g., the expandable ad) associated with the frame buster that sent the post message may be created at 601. In one implementation, the element may be created using the document.createElement( ) JavaScript function.

The element may be configured as an escaped element at 605. For example, configuring the element as an escaped element may inform the expandable ad (e.g., an expandable ad JavaScript object containing associated ad data and/or functions) that it has escaped its iframe and is being created on the webpage top level. In one implementation, the element may be configured as an escaped element based on a class name (e.g., ls_escaped). In another implementation, the element may be configured as an escaped element based on an attribute value (e.g., escaped=true).

A determination may be made at 609 whether the expandable display payload (e.g., data associated with the expandable ad) is cached. If the data is cached, the cached data may be determined at 613. For example, the expandable ad object containing associated ad data and/or functions may be identified. If the data is not cached, expandable ad data may be obtained from an ad server at 617. For example, an expandable ad object may be obtained via an expandable payload request.

The expandable ad may be provided for the user at 621. In one implementation, the source of the element may be set to the location of the expandable ad object initialization script and/or the element may be added to the webpage top level. The expandable ad may be rendered using the element, which is on the webpage top level, and the expandable ad may expand (e.g., if a user tries to initiate the expansion by mousing over the expandable ad or clicking on it or tapping on it).

FIG. 7 shows a screenshot diagram illustrating embodiments of the SBWC. In FIG. 7, screen 701 shows an example of an expandable ad for Home Depot on weather.com prior to expansion. Screen 710 shows the same ad after expansion. Widget 712 illustrates that the expanded ad may provide a user with a multilevel menu that allows the user to browse products, make purchases, utilize a store finder, and/or the like.

FIG. 8 shows a screenshot diagram illustrating embodiments of the SBWC. In FIG. 8, screen 801 shown an example of an expandable ad for Kinky Boots on nytimes.com prior to expansion. Screen 810 shows the same ad after expansion. Widget 812 illustrates that the expanded ad may provide a user with a set of media player controls for an associated media (e.g., a preview video) that allows the user to pause, play, rewind, fast forward, make full screen, mute, and/or the like the associated media.

SBWC Controller

FIG. 9 shows a block diagram illustrating embodiments of a SBWC controller. In this embodiment, the SBWC controller 901 may serve to aggregate, process, store, search, serve, identify, instruct, generate, match, and/or facilitate interactions with a computer through web frame and graphic compositing technologies, and/or other related data.

Typically, users, which may be people and/or other systems, may engage information technology systems (e.g., computers) to facilitate information processing. In turn, computers employ processors to process information; such processors 903 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 929 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SBWC controller 901 may be connected to and/or communicate with entities such as, but not limited to: one or more users from peripheral devices 912 (e.g., user input devices 911); an optional cryptographic processor device 928; and/or a communications network 913.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SBWC controller 901 may be based on computer systems that may comprise, but are not limited to, components such as: a computer systemization 902 connected to memory 929.

Computer Systemization

A computer systemization 902 may comprise a clock 930, central processing unit ("CPU(s)" and/or "processor(s)" (these terms are used interchangeable throughout the disclosure unless noted to the contrary)) 903, a memory 929 (e.g., a read only memory (ROM) 906, a random access memory (RAM) 905, etc.), and/or an interface bus 907, and most frequently, although not necessarily, are all interconnected and/or communicating through a system bus 904 on one or more (mother)board(s) 902 having conductive and/or otherwise transportive circuit pathways through which instructions (e.g., binary encoded signals) may travel to effectuate communications, operations, storage, etc. The computer systemization may be connected to a power source 986; e.g., optionally the power source may be internal. Optionally, a cryptographic processor 926 may be connected to the system bus. In another embodiment, the cryptographic processor, transceivers (e.g., ICs) 974, and/or sensor array (e.g., accelerometer, altimeter, ambient light, barometer, global positioning system (GPS) (thereby allowing SBWC controller to determine its location), gyroscope, magnetometer, pedometer, proximity, ultra-violet sensor, etc.) 973 may be connected as either internal and/or external peripheral devices 912 via the interface bus I/O 908 (not pictured) and/or directly via the interface bus 907. In turn, the transceivers may be connected to antenna(s) 975, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 929 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SBWC controller and beyond through various interfaces. Should processing requirements dictate a greater amount speed and/or capacity, distributed processors (e.g., see Distributed SBWC below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the SBWC may be achieved by implementing a microcontroller such as CAST's R8051XC2 microcontroller; Intel's MCS 51 (i.e., 8051 microcontroller); and/or the like. Also, to implement certain features of the SBWC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SBWC component collection (distributed or otherwise) and/or features may be implemented via the microprocessor and/or via embedded components; e.g., via ASIC, coprocessor, DSP, FPGA, and/or the like. Alternately, some implementations of the SBWC may be implemented with embedded components that are configured and used to achieve a variety of features or signal processing.

Depending on the particular implementation, the embedded components may include software solutions, hardware solutions, and/or some combination of both hardware/software solutions. For example, SBWC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SBWC features. A hierarchy of programmable interconnects allow logic blocks to be interconnected as needed by the SBWC system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the SBWC may be developed on regular FPGAs and then migrated into a fixed version that more resembles ASIC implementations. Alternate or coordinating implementations may migrate SBWC controller features to a final ASIC instead of or in addition to FPGAs. Depending on the implementation all of the aforementioned embedded components and microprocessors may be considered the "CPU" and/or "processor" for the SBWC.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the SBWC thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus(ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 913, the SBWC controller is accessible through remote clients 933*b* (e.g., computers with web browsers) by users 933*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed SBWC below), architectures may similarly be employed to pool, load balance, and/or otherwise decrease/increase the communicative bandwidth required by the SBWC controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user, peripheral devices 912 (e.g., input devices 911), cryptographic processor devices 928, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 912 may be connected and/or communicate to I/O and/or other facilities of the like such as network interfaces, storage interfaces, directly to the interface bus, system bus, the CPU, and/or the like. Peripheral devices may be external, internal and/or part of the SBWC controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 911 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the SBWC controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the SBWC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the SBWC controller and/or a computer systemization may employ various forms of memory 929. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 929 will include ROM 906, RAM 905, and a storage device 914. A storage device 914 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the SBWC component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the SBWC controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SBWC controller to communicate with other entities through a communications network 913. Various communication protocols may be used by the SBWC controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SBWC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SBWC database 919, operating systems, other program components, user interfaces, Web browsers, and/or the like.

Access to the SBWC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SBWC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SBWC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SBWC enabled nodes. The combined application may be nugatory on systems employing standard Web browsers.

Mail Server

A mail server component 921 is a stored program component that is executed by a CPU 903. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SBWC. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the SBWC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the SBWC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SBWC component to engage in secure transactions if so desired. The cryptographic component facilitates the secure accessing of resources on the SBWC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SBWC Database

The SBWC database component 919 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the SBWC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SBWC database is implemented as a data-structure, the use of the SBWC database 919 may be integrated into another component such as the SBWC component 935. Also, the database may be implemented as a mix of data structures, objects, and relational structures. Databases may be consolidated and/or distributed in countless variations (e.g., see Distributed SBWC below). Portions of databases, e.g., tables, may be exported and/or imported and thus decentralized and/or integrated.

In one embodiment, the database component 919 includes several tables 919a-i:

An accounts table 919a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 919b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, UserSocialAccountID, contactType, contactRelalionship, userPhone, userAddress, userCity, userState, userZIPCode, userCountry, userAuthorizationCode, userAccessPrivilges, userPreferences, userRestrictions, and/or the like (the user table may support and/or track multiple entity accounts on a SBWC);

An devices table 919c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_ location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 919*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 919*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 919*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 919*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 919*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 919*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like.

In one embodiment, the SBWC database may interact with other database systems. For example, employing a distributed database system, queries and data access by search SBWC component may treat the combination of the SBWC database, an integrated data security layer database as a single database entity (e.g., see Distributed SBWC below).

In one embodiment, user programs may contain various user interface primitives, which may serve to update the SBWC. Also, various accounts may require custom database tables depending upon the environments and the types of clients the SBWC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919*a-i*. The SBWC may be configured to keep track of various settings, inputs, and parameters via database controllers.

The SBWC database may communicate to and/or with other components in a component collection, including itself, and/or facilities of the like. Most frequently, the SBWC database communicates with the SBWC component, other program components, and/or the like. The database may contain, retain, and provide information regarding other nodes and data.

The SBWCs

The SBWC component 935 is a stored program component that is executed by a CPU. In one embodiment, the SBWC component incorporates any and/or all combinations of the aspects of the SBWC that was discussed in the previous figures. As such, the SBWC affects accessing, obtaining and the provision of information, services, transactions, and/or the like across various communications networks. The features and embodiments of the SBWC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the SBWC's features and facilities, and in many cases reduce the costs, energy consumption/requirements, and extend the life of SBWC's underlying infrastructure; this has the added benefit of making the SBWC more reliable. Similarly, many of the features and mechanisms are designed to be easier for users to use and access, thereby broadening the audience that may enjoy/employ and exploit the feature sets of the SBWC; such ease of use also helps to increase the reliability of the SBWC. In addition, the feature sets include heightened security as noted via the Cryptographic components 920, 926, 928 and throughout, making access to the features and data more reliable and secure The SBWC transforms webpage request inputs, via SBWC components (e.g., FE, FB, TLL, FQ, EPR), into composited expandable element outputs.

The SBWC component enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the SBWC server employs a cryptographic server to encrypt and decrypt communications. The SBWC component may communicate to and/or with other components in a component collection, including itself, and/or facilities of the like. Most frequently, the SBWC component communicates with the SBWC database, operating systems, other program components, and/or the like. The SBWC may contain, communicate, generate, obtain, and/or provide program component, system, user, and/or data communications, requests, and/or responses.

Distributed SBWCs

The structure and/or operation of any of the SBWC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SBWC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for SBWC controller and/or SBWC component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SBWC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
     $input = "";
     $input = socket_read($client, 1024);
     $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. A webpage frame expanding display apparatus, comprising:

a memory;

a component collection in the memory;

a processor disposed in communication with the memory, and configured to issue a plurality of processing instructions from the component collection stored in the memory, wherein the processor issues instructions from the component collection, stored in the memory, to:

provide, via at least one processor, a top level listening component to a top level of a webpage, wherein upon webpage loading the top level listening component is configured to create a node list of first level frames in the webpage;

configure, via at least one processor, a first frame in the webpage to obtain an expandable display payload that includes a frame escaping component, wherein the frame escaping component is configured to:

generate, via at least one processor, a unique frame identifier associated with the expandable display payload;

create, via at least one processor, a second frame configured to obtain a frame buster payload that includes a frame busting component; and add, via at least one processor, a top level event listener for messages from the top level listening component;

wherein the top level event listener is configured, upon receiving a message from the top level listening component, to:

determine, via at least one processor, a unique frame identifier specified in the message from the top level listening component;

verify, via at least one processor, that the unique frame identifier specified in the message from the top level listening component matches the generated unique frame identifier;

determine, via at least one processor, a node list identifier of a first level frame in the webpage specified in the message from the top level listening component; and send, via at least one processor, a message to the frame busting component with the determined node list identifier;

wherein the frame busting component is configured to:

determine, via at least one processor, the unique frame identifier associated with the expandable display payload;

generate, via at least one processor, an executable frame querying component configured to facilitate querying first level frames in the webpage to determine which first level frame contains the expandable display payload using the unique frame identifier associated with the expandable display payload;

send, via at least one processor, a message to the top level listening component with the generated executable frame querying component; and add, via at least one processor, a frame event listener for messages from the frame escaping component;

wherein the frame event listener is configured, upon receiving a message from the frame escaping component, to:

determine, via at least one processor, the node list identifier specified in the message from the frame escaping component;

generate, via at least one processor, an executable expandable payload rebuilding component configured to facilitate rebuilding the expandable display payload in the top level of the webpage using the node list identifier specified in the message from the frame escaping component; and send, via at least one processor, a message to the top level listening component with the generated executable expandable payload rebuilding component;

wherein the top level listening component is further configured to:

add, via at least one processor, a buster event listener for messages from the frame busting component;

wherein the buster event listener is configured, upon receiving a message from the frame busting component, to:

execute, via at least one processor, an executable component provided in the message from the frame busting component.

2. The apparatus of embodiment 1, wherein a frame is an iframe.

3. The apparatus of embodiment 1, wherein a message is a post message.

4. The apparatus of embodiment 1, wherein a node list identifier is an item index in the node list.

5. The apparatus of embodiment 1, wherein the expandable display payload is an expandable ad.

6. The apparatus of embodiment 1, wherein the frame escaping component is further configured to:
determine, via at least one processor, whether escape from the first frame should be attempted.

7. The apparatus of embodiment 1, wherein the unique frame identifier associated with the expandable display payload is a randomly generated number.

8. The apparatus of embodiment 1, wherein the frame busting component is further configured to:
determine, via at least one processor, the unique frame identifier associated with the expandable display payload by parsing a name attribute.

9. The apparatus of embodiment 1, wherein the frame busting component is further configured to:
determine, via at least one processor, a source associated with a first level frame containing the expandable display payload;
wherein the generated executable frame querying component is further configured to:
select, via at least one processor, a first level frame from the node list;
determine, via at least one processor, that the first level frame's source matches the source associated with the first level frame containing the expandable display payload; and
send, via at least one processor, a message to the selected first level frame with a node list identifier of the selected first level frame and the unique frame identifier associated with the expandable display payload.

10. The apparatus of embodiment 1, wherein the frame busting component is further configured to:
determine, via at least one processor, a domain associated with the top level of the webpage;
wherein the message to the top level listening component with the generated executable frame querying component is a post message with target origin set to the determined domain.

11. The apparatus of embodiment 1, wherein the frame busting component is further configured to:
determine, via at least one processor, a source of an initialization script associated with the expandable display payload;
wherein the generated executable expandable payload rebuilding component is further configured to:
create, via at least one processor, an element for the expandable display payload;
set, via at least one processor, the element's source to the source of the initialization script associated with the expandable display payload; and
add, via at least one processor, the element to the top level of the webpage.

12. The apparatus of embodiment 11, wherein the generated executable expandable payload rebuilding component is further configured to:
configure, via at least one processor, the element as an escaped element.

13. The apparatus of embodiment 1, wherein the top level listening component is further configured to:
identify, via at least one processor, a buster domain;
wherein the buster event listener is further configured to:
determine, via at least one processor, an origin of the message from the frame busting component; and
verify, via at least one processor, that the origin of the message from the frame busting component matches the identified buster domain.

14. The apparatus of embodiment 1, wherein the expandable display payload is configured to display in the webpage beyond boundaries of the first frame.

15. The apparatus of embodiment 1, wherein the expandable display payload is configured to expand to display one of: a multilevel menu, a set of media player controls.

16. A webpage frame expanding display non-transient physical medium storing processor-executable components, the components, comprising:
a component collection stored in the medium:
wherein the component collection, stored in the medium, includes processor-issuable instructions to:
provide, via at least one processor, a top level listening component to a top level of a webpage, wherein upon webpage loading the top level listening component is configured to create a node list of first level frames in the webpage;
configure, via at least one processor, a first frame in the webpage to obtain an expandable display payload that includes a frame escaping component, wherein the frame escaping component is configured to:
generate, via at least one processor, a unique frame identifier associated with the expandable display payload;
create, via at least one processor, a second frame configured to obtain a frame buster payload that includes a frame busting component; and
add, via at least one processor, a top level event listener for messages from the top level listening component;
wherein the top level event listener is configured, upon receiving a message from the top level listening component, to:
determine, via at least one processor, a unique frame identifier specified in the message from the top level listening component;

verify, via at least one processor, that the unique frame identifier specified in the message from the top level listening component matches the generated unique frame identifier;

determine, via at least one processor, a node list identifier of a first level frame in the webpage specified in the message from the top level listening component; and send, via at least one processor, a message to the frame busting component with the determined node list identifier;

wherein the frame busting component is configured to:

determine, via at least one processor, the unique frame identifier associated with the expandable display payload;

generate, via at least one processor, an executable frame querying component configured to facilitate querying first level frames in the webpage to determine which first level frame contains the expandable display payload using the unique frame identifier associated with the expandable display payload;

send, via at least one processor, a message to the top level listening component with the generated executable frame querying component; and add, via at least one processor, a frame event listener for messages from the frame escaping component;

wherein the frame event listener is configured, upon receiving a message from the frame escaping component, to:

determine, via at least one processor, the node list identifier specified in the message from the frame escaping component;

generate, via at least one processor, an executable expandable payload rebuilding component configured to facilitate rebuilding the expandable display payload in the top level of the webpage using the node list identifier specified in the message from the frame escaping component; and send, via at least one processor, a message to the top level listening component with the generated executable expandable payload rebuilding component;

wherein the top level listening component is further configured to:

add, via at least one processor, a buster event listener for messages from the frame busting component;

wherein the buster event listener is configured, upon receiving a message from the frame busting component, to:

execute, via at least one processor, an executable component provided in the message from the frame busting component.

17. The medium of embodiment 16, wherein a frame is an iframe.

18. The medium of embodiment 16, wherein a message is a post message.

19. The medium of embodiment 16, wherein a node list identifier is an item index in the node list.

20. The medium of embodiment 16, wherein the expandable display payload is an expandable ad.

21. The medium of embodiment 16, wherein the frame escaping component is further configured to:

determine, via at least one processor, whether escape from the first frame should be attempted.

22. The medium of embodiment 16, wherein the unique frame identifier associated with the expandable display payload is a randomly generated number.

23. The medium of embodiment 16, wherein the frame busting component is further configured to:

determine, via at least one processor, the unique frame identifier associated with the expandable display payload by parsing a name attribute.

24. The medium of embodiment 16, wherein the frame busting component is further configured to:

determine, via at least one processor, a source associated with a first level frame containing the expandable display payload;

wherein the generated executable frame querying component is further configured to:

select, via at least one processor, a first level frame from the node list;

determine, via at least one processor, that the first level frame's source matches the source associated with the first level frame containing the expandable display payload; and send, via at least one processor, a message to the selected first level frame with a node list identifier of the selected first level frame and the unique frame identifier associated with the expandable display payload.

25. The medium of embodiment 16, wherein the frame busting component is further configured to:

determine, via at least one processor, a domain associated with the top level of the webpage;

wherein the message to the top level listening component with the generated executable frame querying component is a post message with target origin set to the determined domain.

26. The medium of embodiment 16, wherein the frame busting component is further configured to:

determine, via at least one processor, a source of an initialization script associated with the expandable display payload;

wherein the generated executable expandable payload rebuilding component is further configured to:

create, via at least one processor, an element for the expandable display payload;

set, via at least one processor, the element's source to the source of the initialization script associated with the expandable display payload; and add, via at least one processor, the element to the top level of the webpage.

27. The medium of embodiment 26, wherein the generated executable expandable payload rebuilding component is further configured to:

configure, via at least one processor, the element as an escaped element.

28. The medium of embodiment 16, wherein the top level listening component is further configured to:

identify, via at least one processor, a buster domain;

wherein the buster event listener is further configured to:

determine, via at least one processor, an origin of the message from the frame busting component; and verify, via at least one processor, that the origin of the message from the frame busting component matches the identified buster domain.

29. The medium of embodiment 16, wherein the expandable display payload is configured to display in the webpage beyond boundaries of the first frame.

30. The medium of embodiment 16, wherein the expandable display payload is configured to expand to display one of: a multilevel menu, a set of media player controls.

31. A processor-implemented webpage frame expanding display system, comprising:
a component collection means, to:
provide, via at least one processor, a top level listening component to a top level of a webpage, wherein upon webpage loading the top level listening component is configured to create a node list of first level frames in the webpage;
configure, via at least one processor, a first frame in the webpage to obtain an expandable display payload that includes a frame escaping component, wherein the frame escaping component is configured to:
generate, via at least one processor, a unique frame identifier associated with the expandable display payload;
create, via at least one processor, a second frame configured to obtain a frame buster payload that includes a frame busting component; and
add, via at least one processor, a top level event listener for messages from the top level listening component;
wherein the top level event listener is configured, upon receiving a message from the top level listening component, to:
determine, via at least one processor, a unique frame identifier specified in the message from the top level listening component;
verify, via at least one processor, that the unique frame identifier specified in the message from the top level listening component matches the generated unique frame identifier;
determine, via at least one processor, a node list identifier of a first level frame in the webpage specified in the message from the top level listening component; and
send, via at least one processor, a message to the frame busting component with the determined node list identifier;
wherein the frame busting component is configured to:
determine, via at least one processor, the unique frame identifier associated with the expandable display payload;
generate, via at least one processor, an executable frame querying component configured to facilitate querying first level frames in the webpage to determine which first level frame contains the expandable display payload using the unique frame identifier associated with the expandable display payload;
send, via at least one processor, a message to the top level listening component with the generated executable frame querying component; and
add, via at least one processor, a frame event listener for messages from the frame escaping component;
wherein the frame event listener is configured, upon receiving a message from the frame escaping component, to:
determine, via at least one processor, the node list identifier specified in the message from the frame escaping component;
generate, via at least one processor, an executable expandable payload rebuilding component configured to facilitate rebuilding the expandable display payload in the top level of the webpage using the node list identifier specified in the message from the frame escaping component, to:
send, via at least one processor, a message to the top level listening component with the generated executable expandable payload rebuilding component;
wherein the top level listening component is further configured to:
add, via at least one processor, a buster event listener for messages from the frame busting component;
wherein the buster event listener is configured, upon receiving a message from the frame busting component, to:
execute, via at least one processor, an executable component provided in the message from the frame busting component.

32. The system of embodiment 31, wherein a frame is an iframe.

33. The system of embodiment 31, wherein a message is a post message.

34. The system of embodiment 31, wherein a node list identifier is an item index in the node list.

35. The system of embodiment 31, wherein the expandable display payload is an expandable ad.

36. The system of embodiment 31, wherein the frame escaping component is further configured to:
determine, via at least one processor, whether escape from the first frame should be attempted.

37. The system of embodiment 31, wherein the unique frame identifier associated with the expandable display payload is a randomly generated number.

38. The system of embodiment 31, wherein the frame busting component is further configured to:
determine, via at least one processor, the unique frame identifier associated with the expandable display payload by parsing a name attribute.

39. The system of embodiment 31, wherein the frame busting component is further configured to:
determine, via at least one processor, a source associated with a first level frame containing the expandable display payload;
wherein the generated executable frame querying component is further configured to:
select, via at least one processor, a first level frame from the node list;
determine, via at least one processor, that the first level frame's source matches the source associated with the first level frame containing the expandable display payload; and
send, via at least one processor, a message to the selected first level frame with a node list identifier of the selected first level frame and the unique frame identifier associated with the expandable display payload.

40. The system of embodiment 31, wherein the frame busting component is further configured to:
determine, via at least one processor, a domain associated with the top level of the webpage;

wherein the message to the top level listening component with the generated executable frame querying component is a post message with target origin set to the determined domain.

41. The system of embodiment 31, wherein the frame busting component is further configured to:
    determine, via at least one processor, a source of an initialization script associated with the expandable display payload;
    wherein the generated executable expandable payload rebuilding component is further configured to:
        create, via at least one processor, an element for the expandable display payload;
        set, via at least one processor, the element's source to the source of the initialization script associated with the expandable display payload; and
        add, via at least one processor, the element to the top level of the webpage.

42. The system of embodiment 41, wherein the generated executable expandable payload rebuilding component is further configured to:
    configure, via at least one processor, the element as an escaped element.

43. The system of embodiment 31, wherein the top level listening component is further configured to:
    identify, via at least one processor, a buster domain;
    wherein the buster event listener is further configured to:
        determine, via at least one processor, an origin of the message from the frame busting component; and
        verify, via at least one processor, that the origin of the message from the frame busting component matches the identified buster domain.

44. The system of embodiment 31, wherein the expandable display payload is configured to display in the webpage beyond boundaries of the first frame.

45. The system of embodiment 31, wherein the expandable display payload is configured to expand to display one of: a multilevel menu, a set of media player controls.

46. A processor-implemented webpage frame expanding display method, comprising:
    executing processor-implemented component collection instructions to:
        provide, via at least one processor, a top level listening component to a top level of a webpage, wherein upon webpage loading the top level listening component is configured to create a node list of first level frames in the webpage;
        configure, via at least one processor, a first frame in the webpage to obtain an expandable display payload that includes a frame escaping component, wherein the frame escaping component is configured to:
            generate, via at least one processor, a unique frame identifier associated with the expandable display payload;
            create, via at least one processor, a second frame configured to obtain a frame buster payload that includes a frame busting component; and
            add, via at least one processor, a top level event listener for messages from the top level listening component;
            wherein the top level event listener is configured, upon receiving a message from the top level listening component, to:
                determine, via at least one processor, a unique frame identifier specified in the message from the top level listening component;
                verify, via at least one processor, that the unique frame identifier specified in the message from the top level listening component matches the generated unique frame identifier;
                determine, via at least one processor, a node list identifier of a first level frame in the webpage specified in the message from the top level listening component; and
                send, via at least one processor, a message to the frame busting component with the determined node list identifier;
            wherein the frame busting component is configured to:
                determine, via at least one processor, the unique frame identifier associated with the expandable display payload;
                generate, via at least one processor, an executable frame querying component configured to facilitate querying first level frames in the webpage to determine which first level frame contains the expandable display payload using the unique frame identifier associated with the expandable display payload;
                send, via at least one processor, a message to the top level listening component with the generated executable frame querying component; and
                add, via at least one processor, a frame event listener for messages from the frame escaping component;
            wherein the frame event listener is configured, upon receiving a message from the frame escaping component, to:
                determine, via at least one processor, the node list identifier specified in the message from the frame escaping component;
                generate, via at least one processor, an executable expandable payload rebuilding component configured to facilitate rebuilding the expandable display payload in the top level of the webpage using the node list identifier specified in the message from the frame escaping component; and
                send, via at least one processor, a message to the top level listening component with the generated executable expandable payload rebuilding component;
    wherein the top level listening component is further configured to:
        add, via at least one processor, a buster event listener for messages from the frame busting component;
        wherein the buster event listener is configured, upon receiving a message from the frame busting component, to:
            execute, via at least one processor, an executable component provided in the message from the frame busting component.

47. The method of embodiment 46, wherein a frame is an iframe.

48. The method of embodiment 46, wherein a message is a post message.

49. The method of embodiment 46, wherein a node list identifier is an item index in the node list.

50. The method of embodiment 46, wherein the expandable display payload is an expandable ad.
51. The method of embodiment 46, wherein the frame escaping component is further configured to:
  determine, via at least one processor, whether escape from the first frame should be attempted.
52. The method of embodiment 46, wherein the unique frame identifier associated with the expandable display payload is a randomly generated number.
53. The method of embodiment 46, wherein the frame busting component is further configured to:
  determine, via at least one processor, the unique frame identifier associated with the expandable display payload by parsing a name attribute.
54. The method of embodiment 46, wherein the frame busting component is further configured to:
  determine, via at least one processor, a source associated with a first level frame containing the expandable display payload;
  wherein the generated executable frame querying component is further configured to:
    select, via at least one processor, a first level frame from the node list;
    determine, via at least one processor, that the first level frame's source matches the source associated with the first level frame containing the expandable display payload; and
    send, via at least one processor, a message to the selected first level frame with a node list identifier of the selected first level frame and the unique frame identifier associated with the expandable display payload.
55. The method of embodiment 46, wherein the frame busting component is further configured to:
  determine, via at least one processor, a domain associated with the top level of the webpage;
  wherein the message to the top level listening component with the generated executable frame querying component is a post message with target origin set to the determined domain.
56. The method of embodiment 46, wherein the frame busting component is further configured to:
  determine, via at least one processor, a source of an initialization script associated with the expandable display payload;
  wherein the generated executable expandable payload rebuilding component is further configured to:
    create, via at least one processor, an element for the expandable display payload;
    set, via at least one processor, the element's source to the source of the initialization script associated with the expandable display payload; and
    add, via at least one processor, the element to the top level of the webpage.
57. The method of embodiment 56, wherein the generated executable expandable payload rebuilding component is further configured to:
  configure, via at least one processor, the element as an escaped element.
58. The method of embodiment 46, wherein the top level listening component is further configured to:
  identify, via at least one processor, a buster domain;
  wherein the buster event listener is further configured to:
    determine, via at least one processor, an origin of the message from the frame busting component; and
    verify, via at least one processor, that the origin of the message from the frame busting component matches the identified buster domain.
59. The method of embodiment 46, wherein the expandable display payload is configured to display in the webpage beyond boundaries of the first frame.
60. The method of embodiment 46, wherein the expandable display payload is configured to expand to display one of: a multilevel menu, a set of media player controls.

In order to address various issues and advance the art, the entirety of this application for Supra Boundary Web Compositor Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SBWC individual and/or enterprise user, database configuration and/or relational model, data type, data transmission and/or network framework, syntax structure, and/or the like, various embodiments of the SBWC, may be implemented that enable a great deal of flexibility and customization. For example, aspects of the SBWC may be adapted for any web frame expansion (e.g., dashboard/widget expansion beyond the initial frame bounds). While various embodiments and discussions of the SBWC have included web frame and graphic compositing, however, it is to be understood that the embodiments described herein may be readily configured and/or customized for a wide variety of other applications and/or implementations.

What is claimed is:

1. A webpage frame expanding display apparatus, comprising:
  at least one memory;
  a component collection in the at least one memory;
  any of at least one processor disposed in communication with the at least one memory, the any of at least one processor executing processor-executable instructions from the component collection, storage of the component collection structured with processor-executable instructions comprising:
    provide, via any of at least one processor, a top level listening component to a top level of a webpage, in which upon webpage loading the top level listening component is structured as to create an encapsulated reusable object-oriented node list datastructure of first level frames in the webpage,
      in which the object-oriented node list datastructure is structured as an object-oriented queryable HTML object of frames;
    structure, via the any of at least one processor, a first frame in the webpage to obtain an expandable display payload that includes a frame escaping component, in which the frame escaping component is structured as including:
      generate, via the any of at least one processor, a unique frame identifier associated with the expandable display payload;
    create, via the any of at least one processor, a second frame structured as to obtain a frame buster payload that includes a frame busting component; and
    add, via the any of at least one processor, a top level event listener for messaging to and from the top level listening component;
    in which the top level event listener is structured as, upon receiving a message from the top level listening component, including:
      determine if the message is a type of expandable display payload, and prevent using the message if it is not a type of expandable display payload;
      determine, via the any of at least one processor, a unique frame identifier specified in the message from the top level listening component;
      verify, via the any of at least one processor, that the unique frame identifier specified in the message from the top level listening component matches the generated unique frame identifier;
      determine, via the any of at least one processor, an object-oriented node list identifier of a first level frame in the webpage specified in the message from the top level listening component; and
      send, via the any of at least one processor, a message to the frame busting component with the determined object-oriented node list identifier;
    in which the frame busting component is structured as including:
      determine, via the any of at least one processor, the unique frame identifier associated with the expandable display payload;
      generate, via the any of at least one processor, an executable frame querying component structured as to facilitate querying first level frames in the webpage to determine which first level frame contains the expandable display payload using the unique frame identifier associated with the expandable display payload;
      send, via the any of at least one processor, a message to the top level listening component with the generated executable frame querying component; and
      add, via the any of at least one processor, a frame event listener for messaging to and from the frame escaping component;
    in which the frame event listener is structured as, upon receiving a message from the frame escaping component, including:
      determine, via the any of at least one processor, the object-oriented node list identifier specified in the message from the frame escaping component;
      generate, via the any of at least one processor, an executable expandable payload rebuilding component structured as to facilitate rebuilding the expandable display payload in the top level of the webpage using the object-oriented node list identifier specified in the message from the frame escaping component; and
      send, via the any of at least one processor, a message to the top level listening component with the generated executable expandable payload rebuilding component;

in which the top level listening component is further structured as including:
add, via the any of at least one processor, a buster event listener for messaging to and from the frame busting component;
in which the buster event listener is structured as, upon receiving a message from the frame busting component, including:
execute, via the any of at least one processor, an executable component provided in the message from the frame busting component.

2. The apparatus of claim 1, in which any of: a first frame and a second frame is an iframe.

3. The apparatus of claim 1, in which the message is a post message.

4. The apparatus of claim 1, in which the object-oriented node list identifier is an item index in the object-oriented node list.

5. The apparatus of claim 1, in which the expandable display payload is an expandable ad.

6. The apparatus of claim 1, in which the frame escaping component is further structured as including:
determine, via the any of at least one processor, whether escape from the first frame should be attempted.

7. The apparatus of claim 1, in which the unique frame identifier associated with the expandable display payload is a randomly generated number.

8. The apparatus of claim 1, in which the frame busting component is further structured as including:
determine, via the any of at least one processor, the unique frame identifier associated with the expandable display payload by parsing a name attribute.

9. The apparatus of claim 1, in which the frame busting component is further structured as including:
determine, via the any of at least one processor, a source associated with a first level frame containing the expandable display payload;
in which the generated executable frame querying component is further structured as including:
select, via the any of at least one processor, a first level frame from the object-oriented node list;
determine, via the any of at least one processor, that the first level frame's source matches the source associated with the first level frame containing the expandable display payload; and
send, via the any of at least one processor, a message to the selected first level frame with an object-oriented node list identifier of the selected first level frame and the unique frame identifier associated with the expandable display payload.

10. The apparatus of claim 1, in which the frame busting component is further structured as including:
determine, via the any of at least one processor, a domain associated with the top level of the webpage;
in which the message to the top level listening component with the generated executable frame querying component is a post message with target origin set to the determined domain.

11. The apparatus of claim 1, in which the frame busting component is further structured as including:
determine, via the any of at least one processor, a source of an initialization script associated with the expandable display payload;
in which the generated executable expandable payload rebuilding component is further structured as including:

create, via the any of at least one processor, an element for the expandable display payload;
set, via the any of at least one processor, the element's source to the source of the initialization script associated with the expandable display payload; and
add, via the any of at least one processor, the element to the top level of the webpage.

12. The apparatus of claim 11, in which the generated executable expandable payload rebuilding component is further structured as including:
structure, via the any of at least one processor, the element as an escaped element.

13. The apparatus of claim 1, in which the top level listening component is further structured as including:
identify, via the any of at least one processor, a buster domain;
in which the buster event listener is further structured as including:
determine, via the any of at least one processor, an origin of the message from the frame busting component; and
verify, via the any of at least one processor, that the origin of the message from the frame busting component matches the identified buster domain.

14. The apparatus of claim 1, in which the expandable display payload is structured as to display in the webpage beyond boundaries of the first frame.

15. The apparatus of claim 1, in which the expandable display payload is structured as to expand to display any of: a multilevel menu, a set of media player controls.

16. A webpage frame expanding display processor-readable, non-transient medium, the medium storing a component collection, storage of the component collection structured with processor-executable instructions comprising:
provide, via any of at least one processor, a top level listening component to a top level of a webpage, in which upon webpage loading the top level listening component is structured as to create an encapsulated reusable object-oriented node list of first level frames in the webpage,
in which the object-oriented node list datastructure is structured as an HTML object of frames;
structure, via the any of at least one processor, a first frame in the webpage to obtain an expandable display payload that includes a frame escaping component, in which the frame escaping component is structured as including:
generate, via the any of at least one processor, a unique frame identifier associated with the expandable display payload;
create, via the any of at least one processor, a second frame structured as to obtain a frame buster payload that includes a frame busting component; and
add, via the any of at least one processor, a top level event listener for messaging to and from the top level listening component;
in which the top level event listener is structured as, upon receiving a message from the top level listening component, including:
determine if the message is a type of expandable display payload, and prevent using the message if it is not a type of expandable display payload;
determine, via the any of at least one processor, a unique frame identifier specified in the message from the top level listening component;
verify, via the any of at least one processor, that the unique frame identifier specified in the message from the top level listening component matches the generated unique frame identifier;
determine, via the any of at least one processor, an object-oriented node list identifier of a first level frame in the webpage specified in the message from the top level listening component; and
send, via the any of at least one processor, a message to the frame busting component with the determined object-oriented node list identifier;
in which the frame busting component is structured as including:
determine, via the any of at least one processor, the unique frame identifier associated with the expandable display payload;
generate, via the any of at least one processor, an executable frame querying component structured as to facilitate querying first level frames in the webpage to determine which first level frame contains the expandable display payload using the unique frame identifier associated with the expandable display payload;
send, via the any of at least one processor, a message to the top level listening component with the generated executable frame querying component; and
add, via the any of at least one processor, a frame event listener for messaging to and from the frame escaping component;
in which the frame event listener is structured as, upon receiving a message from the frame escaping component, including:
determine, via the any of at least one processor, the object-oriented node list identifier specified in the message from the frame escaping component;
generate, via the any of at least one processor, an executable expandable payload rebuilding component structured as to facilitate rebuilding the expandable display payload in the top level of the webpage using the object-oriented node list identifier specified in the message from the frame escaping component; and
send, via the any of at least one processor, a message to the top level listening component with the generated executable expandable payload rebuilding component;
in which the top level listening component is further structured as including:
add, via the any of at least one processor, a buster event listener for messaging to and from the frame busting component;
in which the buster event listener is structured as, upon receiving a message from the frame busting component, including:
execute, via the any of at least one processor, an executable component provided in the message from the frame busting component.

17. A processor-implemented webpage frame expanding display system, comprising:
means to store a component collection;
means to process processor-executable instructions from the component collection, storage of the component collection structured with processor-executable instructions including:
provide, via any of at least one processor, a top level listening component to a top level of a webpage, in which upon webpage loading the top level listening component is structured as to create an encapsulated reusable object-oriented node list of first level frames in the webpage,
in which the object-oriented node list datastructure is structured as an HTML object of frames;
structure, via the any of at least one processor, a first frame in the webpage to obtain an expandable display payload that includes a frame escaping component, in which the frame escaping component is structured as including:
generate, via the any of at least one processor, a unique frame identifier associated with the expandable display payload;
create, via the any of at least one processor, a second frame structured as to obtain a frame buster payload that includes a frame busting component; and
add, via the any of at least one processor, a top level event listener for messaging to and from the top level listening component;
in which the top level event listener is structured as, upon receiving a message from the top level listening component, including:
determine if the message is a type of expandable display payload, and prevent using the message if it is not a type of expandable display payload;
determine, via the any of at least one processor, a unique frame identifier specified in the message from the top level listening component;
verify, via the any of at least one processor, that the unique frame identifier specified in the message from the top level listening component matches the generated unique frame identifier;
determine, via the any of at least one processor, an object-oriented node list identifier of a first level frame in the webpage specified in the message from the top level listening component; and
send, via the any of at least one processor, a message to the frame busting component with the determined object-oriented node list identifier;
in which the frame busting component is structured as including:
determine, via the any of at least one processor, the unique frame identifier associated with the expandable display payload;
generate, via the any of at least one processor, an executable frame querying component structured as to facilitate querying first level frames in the webpage to determine which first level frame contains the expandable display payload using the unique frame identifier associated with the expandable display payload;
send, via the any of at least one processor, a message to the top level listening component with the generated executable frame querying component; and
add, via the any of at least one processor, a frame event listener for messaging to and from the frame escaping component;
in which the frame event listener is structured as, upon receiving a message from the frame escaping component, including:
determine, via the any of at least one processor, the object-oriented node list identifier specified in the message from the frame escaping component;

generate, via the any of at least one processor, an executable expandable payload rebuilding component structured as to facilitate rebuilding the expandable display payload in the top level of the webpage using the object-oriented node list identifier specified in the message from the frame escaping component; and send, via the any of at least one processor, a message to the top level listening component with the generated executable expandable payload rebuilding component;

in which the top level listening component is further structured as including:

add, via the any of at least one processor, a buster event listener for messaging to and from the frame busting component;

in which the buster event listener is structured as, upon receiving a message from the frame busting component, including:

execute, via the any of at least one processor, an executable component provided in the message from the frame busting component.

18. A webpage frame expanding display process, including processing processor-executable via any of at least one processor from a component collection stored in at least one memory, storage of the component collection structured with processor-executable instructions comprising:

provide, via any of at least one processor, a top level listening component to a top level of a webpage, in which upon webpage loading the top level listening component is structured as to create an encapsulated reusable object-oriented node list of first level frames in the webpage, in which the object-oriented node list datastructure is structured as an HTML object of frames;

structure, via the any of at least one processor, a first frame in the webpage to obtain an expandable display payload that includes a frame escaping component, in which the frame escaping component is structured as including:

generate, via the any of at least one processor, a unique frame identifier associated with the expandable display payload;

create, via the any of at least one processor, a second frame structured as to obtain a frame buster payload that includes a frame busting component; and add, via the any of at least one processor, a top level event listener for messaging to and from the top level listening component;

in which the top level event listener is structured as, upon receiving a message from the top level listening component, including:

determine if the message is a type of expandable display payload, and prevent using the message if it is not a type of expandable display payload;

determine, via the any of at least one processor, a unique frame identifier specified in the message from the top level listening component;

verify, via the any of at least one processor, that the unique frame identifier specified in the message from the top level listening component matches the generated unique frame identifier;

determine, via the any of at least one processor, an object-oriented node list identifier of a first level frame in the webpage specified in the message from the top level listening component; and send, via the any of at least one processor, a message to the frame busting component with the determined object-oriented node list identifier;

in which the frame busting component is structured as including:

determine, via the any of at least one processor, the unique frame identifier associated with the expandable display payload;

generate, via the any of at least one processor, an executable frame querying component structured as to facilitate querying first level frames in the webpage to determine which first level frame contains the expandable display payload using the unique frame identifier associated with the expandable display payload;

send, via the any of at least one processor, a message to the top level listening component with the generated executable frame querying component; and add, via the any of at least one processor, a frame event listener for messaging to and from the frame escaping component;

in which the frame event listener is structured as, upon receiving a message from the frame escaping component, including:

determine, via the any of at least one processor, the object-oriented node list identifier specified in the message from the frame escaping component;

generate, via the any of at least one processor, an executable expandable payload rebuilding component structured as to facilitate rebuilding the expandable display payload in the top level of the webpage using the object-oriented node list identifier specified in the message from the frame escaping component; and send, via the any of at least one processor, a message to the top level listening component with the generated executable expandable payload rebuilding component;

in which the top level listening component is further structured as including:

add, via the any of at least one processor, a buster event listener for messaging to and from the frame busting component;

in which the buster event listener is structured as, upon receiving a message from the frame busting component, including:

execute, via the any of at least one processor, an executable component provided in the message from the frame busting component.

* * * * *